US009906183B1

(12) United States Patent
Agirman

(10) Patent No.: US 9,906,183 B1
(45) Date of Patent: Feb. 27, 2018

(54) PARALLEL INTERLEAVED 2-LEVEL OR 3-LEVEL REGENERATIVE DRIVES

(71) Applicant: OTIS ELEVATOR COMPANY, Farmington, CT (US)

(72) Inventor: Ismail Agirman, Southington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/419,670

(22) Filed: Jan. 30, 2017

(51) Int. Cl.
| H02P 27/04 | (2016.01) |
| H02P 27/08 | (2006.01) |
| H02M 7/487 | (2007.01) |
| H02M 5/458 | (2006.01) |
| B66B 11/04 | (2006.01) |

(52) U.S. Cl.
CPC ............ *H02P 27/08* (2013.01); *B66B 11/043* (2013.01); *H02M 5/4585* (2013.01); *H02M 7/487* (2013.01)

(58) Field of Classification Search
CPC ...... H02P 1/00; H02P 3/00; H02P 6/00; H02P 7/00; H02P 21/00; H02P 27/06; H02P 41/00; H02P 41/02; H02P 27/04
USPC .... 318/400.01, 400.02, 400.14, 400.15, 700, 318/701, 726, 727, 779, 799, 800, 801, 318/805, 807, 430; 363/21.1, 40, 44, 95, 363/120, 174, 175, 52, 108, 109, 173, 363/176
See application file for complete search history.

(56) References Cited

U.S. PATENT DOCUMENTS

| 3,792,286 A | 2/1974 | Meier |
| 3,902,073 A | 8/1975 | Lafuze |
| 3,958,173 A | 5/1976 | Christianson et al. |
| 5,130,561 A | 7/1992 | Elliott et al. |
| 5,245,525 A | 9/1993 | Galloway et al. |
| 5,434,771 A | 7/1995 | Danby et al. |
| 7,102,343 B1 | 9/2006 | Brown |
| 7,109,681 B2 | 9/2006 | Baker et al. |
| 7,110,266 B1 | 9/2006 | Porter et al. |
| 7,825,726 B2 | 11/2010 | Midya et al. |
| 8,487,568 B2 | 7/2013 | Franke |

(Continued)

OTHER PUBLICATIONS

Balasubramani, S. et al; "Parallel Connected 12 Pulse Rectifier using Inter Phase Transformer"; Indian Journal of Science and Technology; vol. 8(32); Nov. 2015; 4 pages.

(Continued)

*Primary Examiner* — Antony M Paul
(74) *Attorney, Agent, or Firm* — Cantor Colburn LLP

(57) ABSTRACT

A paralleled drive having a first plurality of interphase inductors to distribute three phase alternating current power to a first and a second converter that transfer power to a first and a second direct current (DC) buses respectively, a bus coupler connecting the first and second DC buses, a first and a second inverter connected to the first and second DC buses respectively. The drive also includes a controller connected to the first and second converters and the first and second inverters, the controller generates control signals to cause the first and second converter to transfer power to the first and second direct current (DC) buses respectively, and the controller configured to generate control signals to cause the first and the second inverters to generate a plurality of motor excitation signals respectively, and a second plurality of interphase inductors operable to combine the plurality of motor excitation signals.

28 Claims, 16 Drawing Sheets

(56) References Cited

U.S. PATENT DOCUMENTS

| | | |
|---|---|---|
| 9,093,986 B2 | 7/2015 | O'Malley et al. |
| 9,654,021 B2 * | 5/2017 | Wei .................... H02M 5/4585 |
| 2015/0098257 A1 * | 4/2015 | Wei .................... H02M 5/4585 363/37 |
| 2016/0329811 A1 | 11/2016 | Du et al. |

OTHER PUBLICATIONS

Schoroder, Stefan, et al; Modular High-Power Shunt-Interleaved Drive System: A Realization Up to 35 MW for Oil and Gas Applications; IEEE Transactions on Industry Applications May 2010; vol. 46, No. 2; 821-830 pages.

* cited by examiner

US 9,906,183 B1

PARALLEL INTERLEAVED 2-LEVEL OR 3-LEVEL REGENERATIVE DRIVES

TECHNICAL FIELD

The subject matter disclosed herein relates generally to conveyance systems, and more particularly to a conveyance system having drives arranged in an electrically parallel manner.

BACKGROUND

Conveyance systems, such as elevator systems, use machines to impart force to a car carrying passengers. The machines employed may need to provide varying power levels depending on the application. When an elevator requires a large elevator duty or load, a drive needs be provided to power the elevator machine. Often, a high power drive may not exist, which results in high design costs and lengthy development time to manufacture a suitable drive. Even if a single, large drive exists in the marketplace, costs associated with a single, large drive may be excessive due to specialty components, component availability, and the like.

BRIEF SUMMARY

According to an exemplary embodiment,
In addition to one or more of the features described above or below, or as an alternative, further embodiments could include
In addition to one or more of the features described above or below, or as an alternative, further embodiments may include.
Other aspects, features, and techniques of embodiments will become more apparent from the following description taken in conjunction with the drawings.

BRIEF DESCRIPTION OF THE DRAWINGS

The described subject matter is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
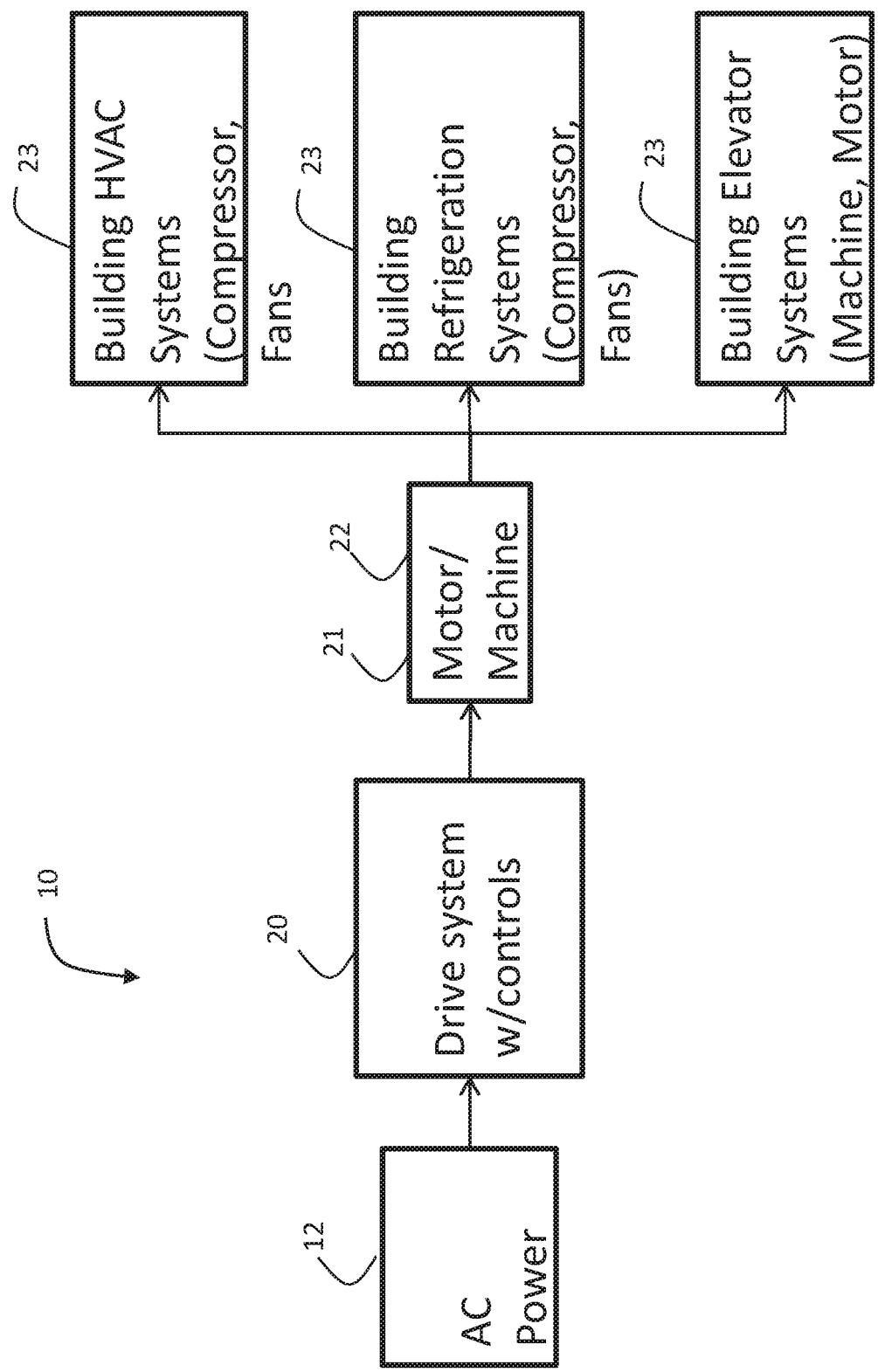
FIG. 1 is a block diagram of components of a motor drive system in accordance with an embodiment.

In general, embodiments herein relate to a 2-level and 3-level drives employing an active converter to supply a DC bus that in turn supplies voltage to an inverter that generates motor excitation signals to drive a motor. Moreover, embodiments herein are directed to configuring and controlling the converter and inverter to minimize or eliminate common mode noise between a direct current (DC) bus and an alternating current (AC) source. Embodiments herein set forth a drive and motor system and/or method for a 2-level and 3-level converter to actively control a DC voltage typically generated from an AC side sinusoidal current. The DC voltage is employed to generate AC excitation voltage using fast switching of power electronics devices to control a motor.

Switching of power electronics devices in active front-end rectifier also generates electromagnetic interference (EMI), which can pose potential problems for nearby and connected components. EMI filters are designed to attenuate EMI noise to satisfy the EMI standards, which are defined for particular applications, but EMI filters add weight and complexity for the rectifier system. Further, a more complex topology for an active front-end rectifier can be applied to further reduce the Common Mode (CM) voltage. For example, paralleled active converters/rectifiers have more control freedoms than the standard two-level rectifier. Thus, the 2-level and 3-level three phase converter and inverter with and without interleaving provides a PWM method to achieve reduced CM-voltage for paralleled converters and inverters that is simple and more cost effective permitting relatively simple paralleling of existing motor drive topologies.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

In an embodiment, a three-phase 2-level or 3-level drive is utilized in an electric motor system or power system of an elevator system. The elevator system also includes a hoistway having one or more of lanes or shafts. In each shaft, one or more elevator car travels to deliver passengers to a desired floor of a building. The electric motor system utilizes the power electronics inverter (e.g., as variable speed alternating drive (AC) motor drive) to improve the performance of maneuvering the elevator cars. Other applications and embodiments include powers systems for trains, boats, planes, etc.

Further, in another embodiment a 2-level or 3-level drive is used to drive a motor in a heating ventilation and air conditioning or refrigeration system HVAC/R system. The conventional HVAC/R system incorporates a closed refrigerant loop in a vapor compression cycle. The vapor-compression cycle uses a circulating refrigerant as the medium which absorbs and removes heat from the space to be cooled and subsequently rejects that heat elsewhere. All such systems have four basic components: a compressor, a condenser, a thermal expansion valve (also called a throttle valve or metering device), and an evaporator. In large scale HVAC systems or chillers, the compressor is large and driven by a very large motor requiring dedicated motor drives such as described herein with high voltage and current capabilities. In some instances the drive may include a converter that is a three-phase 2-level or 3-level active front-end. The drive may also include a power electronics inverter (e.g., as a variable speed alternating current (AC) motor drive) to improve the performance of the chiller system. In an embodiment a 2-level or 3-level converter and inverter is used to drive a motor with and without interleaving is disclosed.

FIG. 1 is a block diagram of components of a power system 10 of an embodiment as may be employed to power one or more building systems or loads 23. In an embodiment the power system 10 is described with respect to elevator system, however application to any system where a motor drive is employed may be envisioned. Power system 10 includes a source of AC power 12, such as an electrical main line (e.g., 440 volt, 3-phase). The AC power 12 is provided to a drive system 20. In addition, the drive system 20 may be configured as a regenerative drive system capable of harnessing regenerative energy from the system being driven. As described in further detail herein, drive system 20 includes a plurality of drives 20 arranged in a parallel electrical configuration. Each drive may include a converter to convert the AC power 12 to a DC voltage. Each drive also includes an inverter to convert the DC voltage to multiphase, AC drive signals. Drive signals from the drive system 20 are supplied to a multiphase machine 22 to impart motion to elevator car 23. In an exemplary embodiment, machine 22 includes a multiphase, permanent magnet synchronous motor 21.

Figure 2:
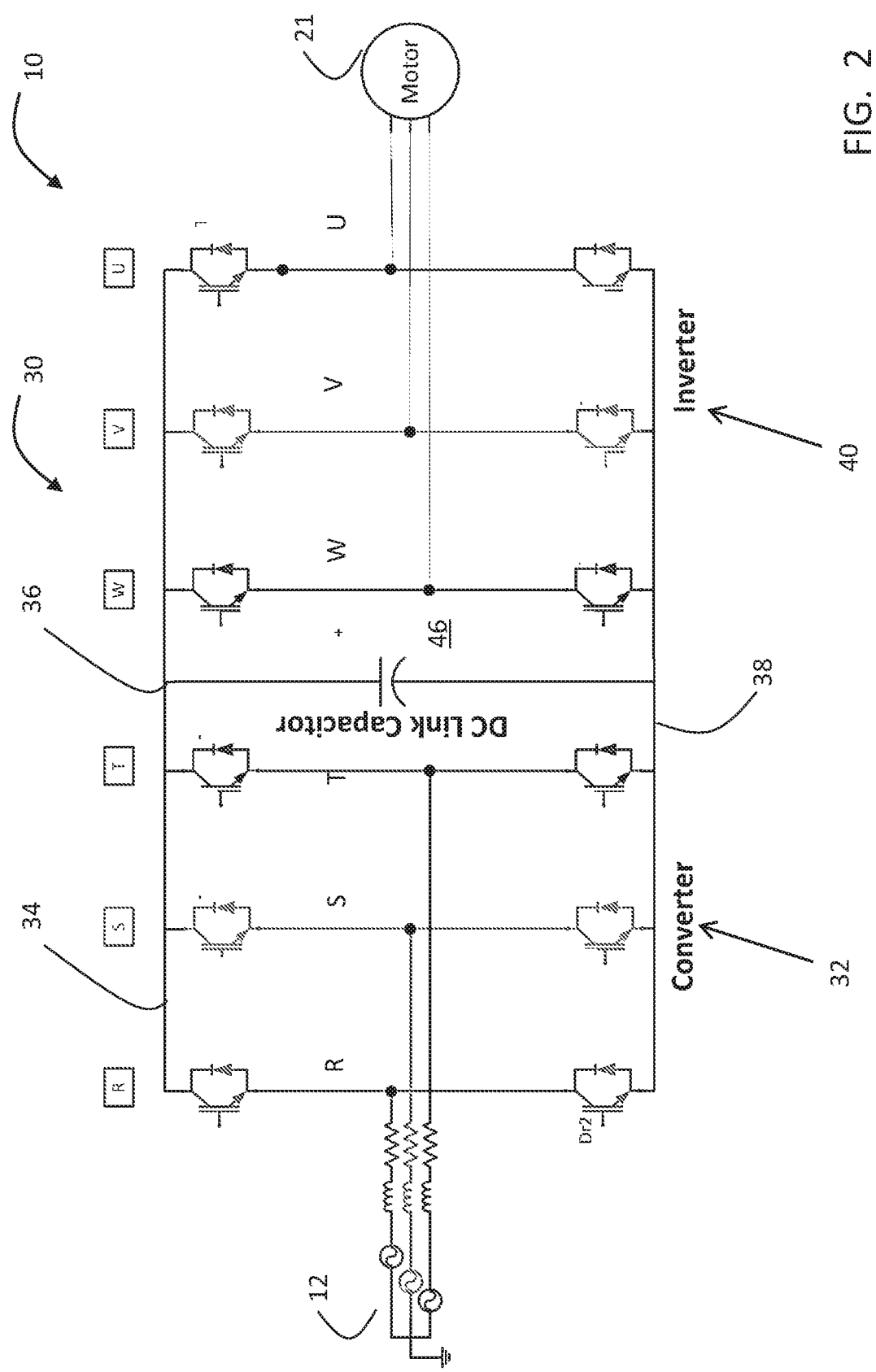
FIG. 2 is a simplified schematic of a 2 level, 3 phase drive used in an embodiment.

FIG. 2 is a simplified schematic of a power system 10 with a 2 level, 3 phase drive 30 used in exemplary embodiments. The power system 10 includes a source of AC power 12, such as an electrical main line (e.g., 440 volt, 3-phase). Drive 30 includes a converter 32 having 3 phase legs, R, S, and T. Each phase leg, R, S, and T, includes switching devices controlled by control signals from a drive controller to convert AC power to DC power across a first DC bus 34 with a positive terminal 36 and a second DC bus 34' with a negative terminal 38. Drive 30 includes an inverter 40 having 3 phase legs, W, V, and U. Each phase leg, W, V, and U, includes switching devices controlled by control signals from a drive controller to convert DC power across the DC bus 34, 36 to AC drive signals to power motor 21, which is part of machine 22.

Figure 3:
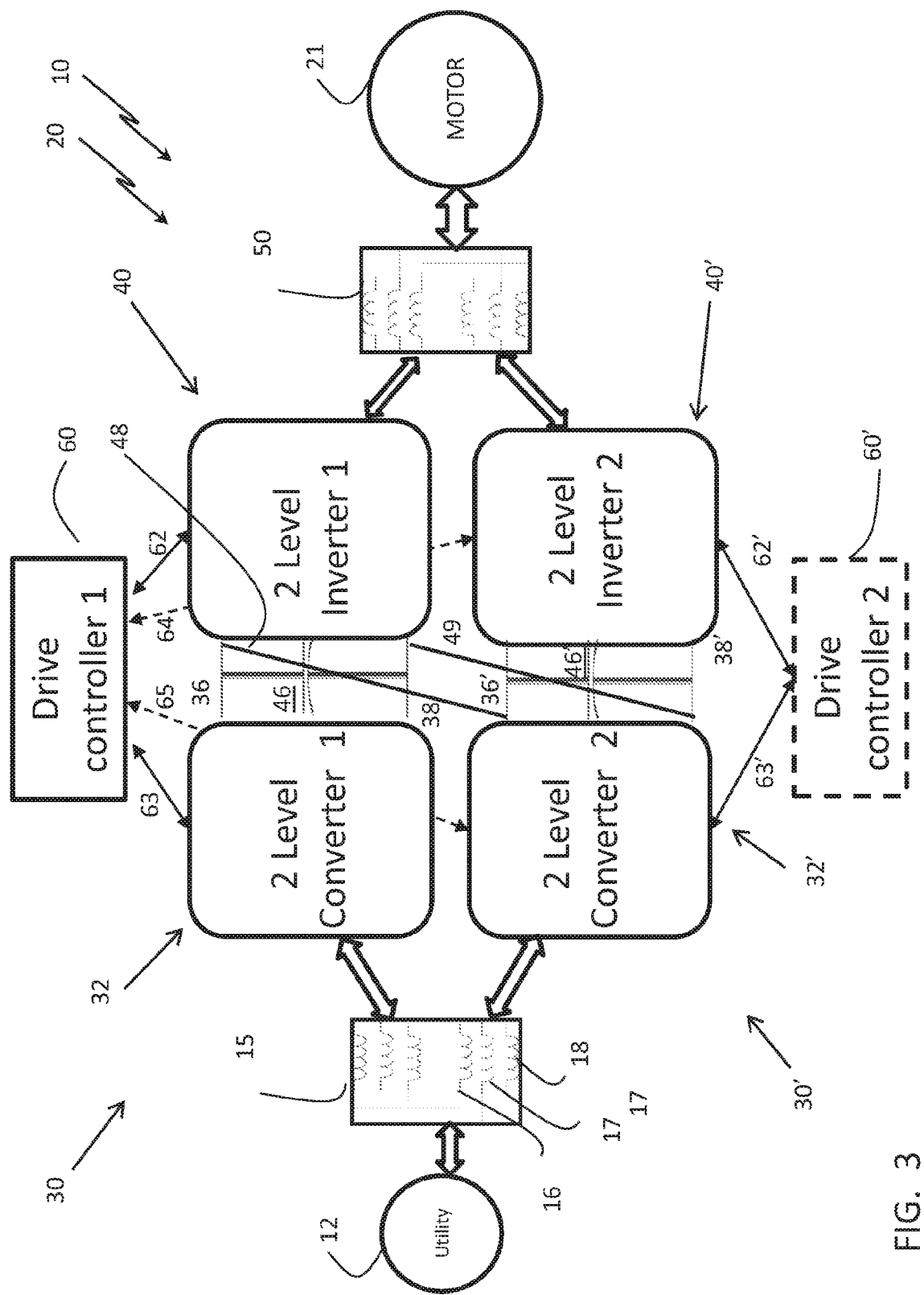
FIG. 3 is a block diagram of a 2 level, 3 phase paralleled drive in accordance with an embodiment.
Figure 4:
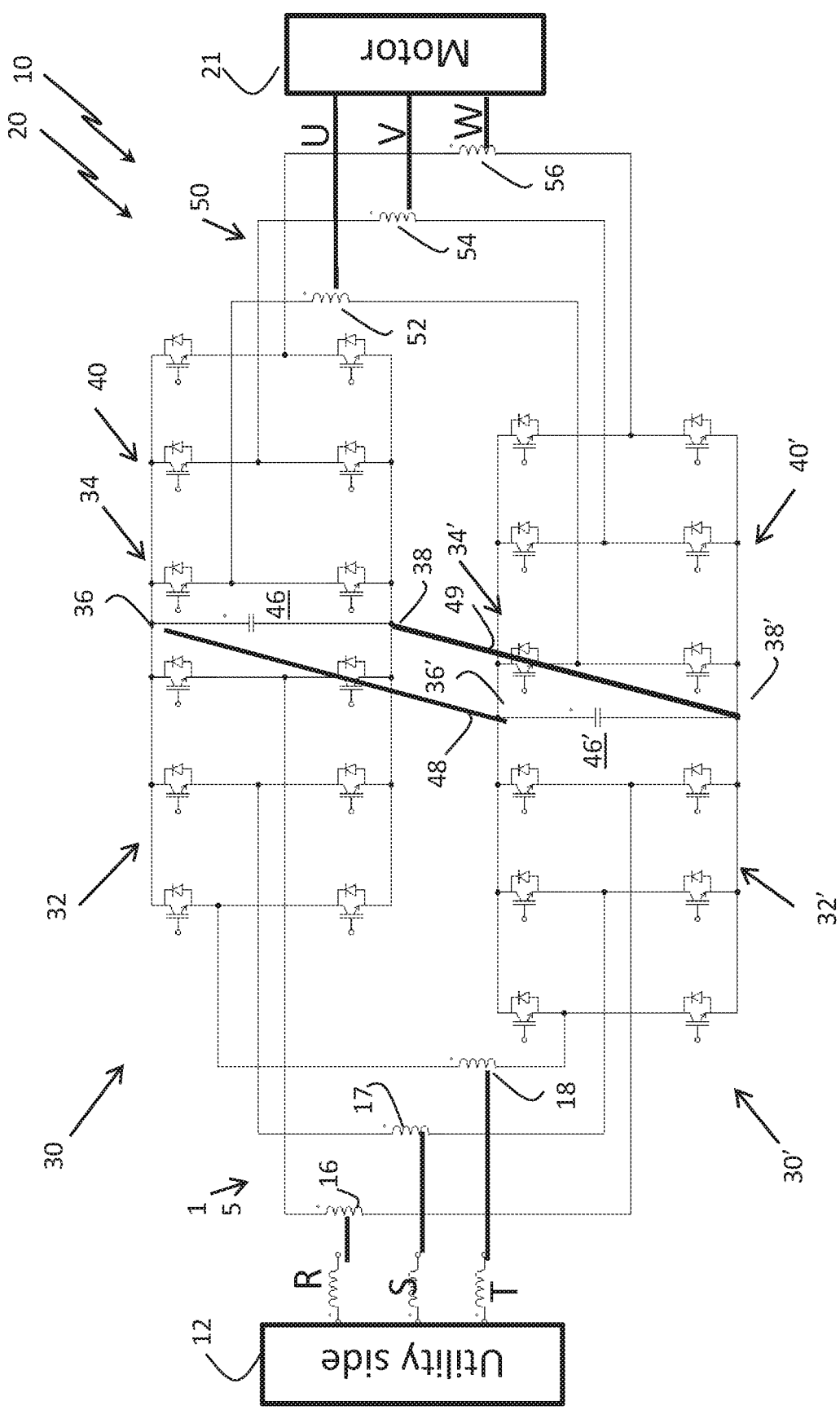
FIG. 4 is a simplified schematic of a 2 level, 3 phase drive used in an embodiment.

Turning now to FIGS. 3 and 4 as well, where FIG. 3 depicts a simplified block diagram of a power system 10 is depicted. FIG. 4 depicts a simplified schematic of a power system 10 in accordance with an exemplary embodiment. As described in further detail herein, drive system 20 includes a plurality of 2-level drives 30 arranged in a parallel electrical configuration. The power system 10 includes a source of AC power 12, such as an electrical main line (e.g., 440 volt, 3-phase). Each drive system 20 may include a 2 level converter 32, 32' to convert the AC power 12 to a DC voltage. The 3 phase AC power 12 is connected to an inductive interface 15, which distributes current from each respective phase of the AC power 12 to the drives 30 and 30' through inductive elements 16, 17, and 18 (e.g., inductors). Inductive interface 15 also acts as a voltage suppression filter. In an embodiment, the inductive interface 15 is one or more interphase inductors. Interphase inductors are commonly configured as two windings on a common core with opposite polarity ends tied together as the common output. A conventional interphase inductor would operate pass signals that are different from each of the inputs, but would block or cancel signals that are common. To that end, the interphase inductor operates to distribute excitation current to the paralleled converters 32 and 32' yet suppress common mode circulating currents in the paralleled drives 30, 30'. In other words a properly designed interphase reactor/inductor 16, 17, 18 will operate to pass equal currents to each converter 32, 32' and without imposing any voltage drop across it for the fundamental voltage waveform while it prevents current that try to run from one converter to the other.

Continuing with FIGS. 3 and 4, each drive system 20 may include a 2 level inverter 40, 40' to convert the DC voltage to multiphase, AC drive signals to drive a machine 22 (shown in FIG. 1). The drive system 20 includes paralleled drives 30 and 30' in an embodiment. The two drives 30, 30' include an active converter 32, 32' and an inverter 40, and 40' connected in parallel to provide drive signals to motor 21. In an embodiment both converters and inverters 40, 40' are controlled by a single controller 60. In an alternative embodiment, each converter 32 and 32' and inverter 40 and 40' is controlled by a separate drive controller, 60 and 60', for each drive 20 and 20' respectively. Drive controllers 60 and 60' provide control signals 63, 63', 62, 62' to the converters 32 and 32 and inverters 40 and 40', respectively, to control generation of the DC voltage on the DC buses 34 and 34' as well as to control generation of the drive signals to motor 21. Drive controllers 60, 60' may be implemented using a general-purpose microprocessor executing a computer program stored on a storage medium to perform the operations described herein. Alternatively, drive controllers 60, 60' may be implemented in hardware (e.g., ASIC, FPGA) or in a combination of hardware/software.

In an embodiment, each drive 30 and 30' is 2 level, 3 phase drives, such as that shown in FIG. 2. Drives 30 and 30' are placed in parallel by electrically connecting the positive DC bus of each drive 30 and 30' as will be described in further detail herein. The 3 phase drive signals from drives 30 and 30' are connected to an inductive interface 50, which combines each respective phase from the drives 30 and 30' through inductive elements 52, 54, 56 (e.g., inductors). Inductive interface 50 allows for combining of respective phases from the two separate drives 30 and 30'. Inductive interface 50 also acts as a voltage suppression filter. In an embodiment, the inductive interface 50 and the inductive elements are comprised of one or more interphase inductors. Interphase inductors are commonly configured as two windings on a common core with opposite polarity ends tied together as the common output. A conventional interphase inductor would operate pass signals that are different from each of the inputs, but would block or cancel signals that are common. To that end, the interphase inductor operates to sum the motor excitation signals (namely the currents) from the paralleled inverters 40 and 40' yet suppress common mode circulating currents. In other words a properly designed inductive interface including inductive elements with interphase reactor/inductor 52, 54, 56 will sum up current from each inverter 40, 40' and without imposing any voltage drop across it for the fundamental voltage waveform while it prevents currents that try to run from one inverter to the other. Although two drives 30 and 30' are shown in FIGS. 3 and 4, it is understood that embodiments may include more than two drives connected in parallel.

FIG. 3 is a more detailed diagram of the 2 level, 3-phase paralleled drive 20 of an embodiment. Each of the drives 30, 30' includes an active converter 32, 32' having 3 phase input, R, S and T to convert AC power from the utility 12 to DC power such as depicted in FIG. 2. The output of the active converter 32, 32' is directed to the DC bus 34, 34'. The capacitor 46, 46' is placed across a first DC bus 34 with a positive terminal 36 and a negative terminal 38 and a second DC bus 34' with a positive terminal 36' and a negative terminal 38', respectively. DC bus coupling 48 ties together the positive terminal 36 for the first DC bus 34 with a positive terminal 36' of the second DC 34', while DC bus coupling 49 ties together the negative terminal 38 of the first DC bus 34 with the negative terminal 38' of a second DC bus 34'. In operation, current and voltages will change on the DC bus 34 or 34' as a function of the switching and loading in the inverter 40, 40'. In addition, paralleling the converters 32, 32' and inverters 40, 40' will introduce the potential for circulating currents. The interphase inductors 16, 17, 18 of the and 52, 54, and 56' operate with increased impedance to oppose those changes and any circulating currents induced. Likewise, capacitors 46, 46' operates in a conventional manner to oppose any voltage changes on the DC bus 34, 34'. The DC bus coupling 48 and 49 ties the DC busses 34, 34' together. Thereby, the LC circuit in cooperation operates to stabilize the current and voltage and loads of the DC bus 34, 34' and maintain equal sharing of (input) current on each DC bus 34, 34'.

Drive 30 also includes a first inverter 40 having 3 phase legs, W, V, and U. Each phase leg, W, V, and U, includes switches controlled by control signals from a drive controller 60 (See FIG. 3) in a conventional manner to convert DC power across the DC bus 34, to AC drive signals to power motor 21, which is part of machine 22 (not shown). Likewise, drive 30' includes a second inverter 40' once again having 3 phase legs, W', V', and U'. Each phase leg, W', V', and U' includes switches controlled by control signals from at least one drive controller to convert DC power across the DC bus 34' to AC drive signals to power motor 21, which is part of machine 22. The inverters 40, 40' are conventional for motor drives. In an embodiment, the inverters 40, 40' employ at least six switching devices in three separate parallel legs.

Figure 5A:
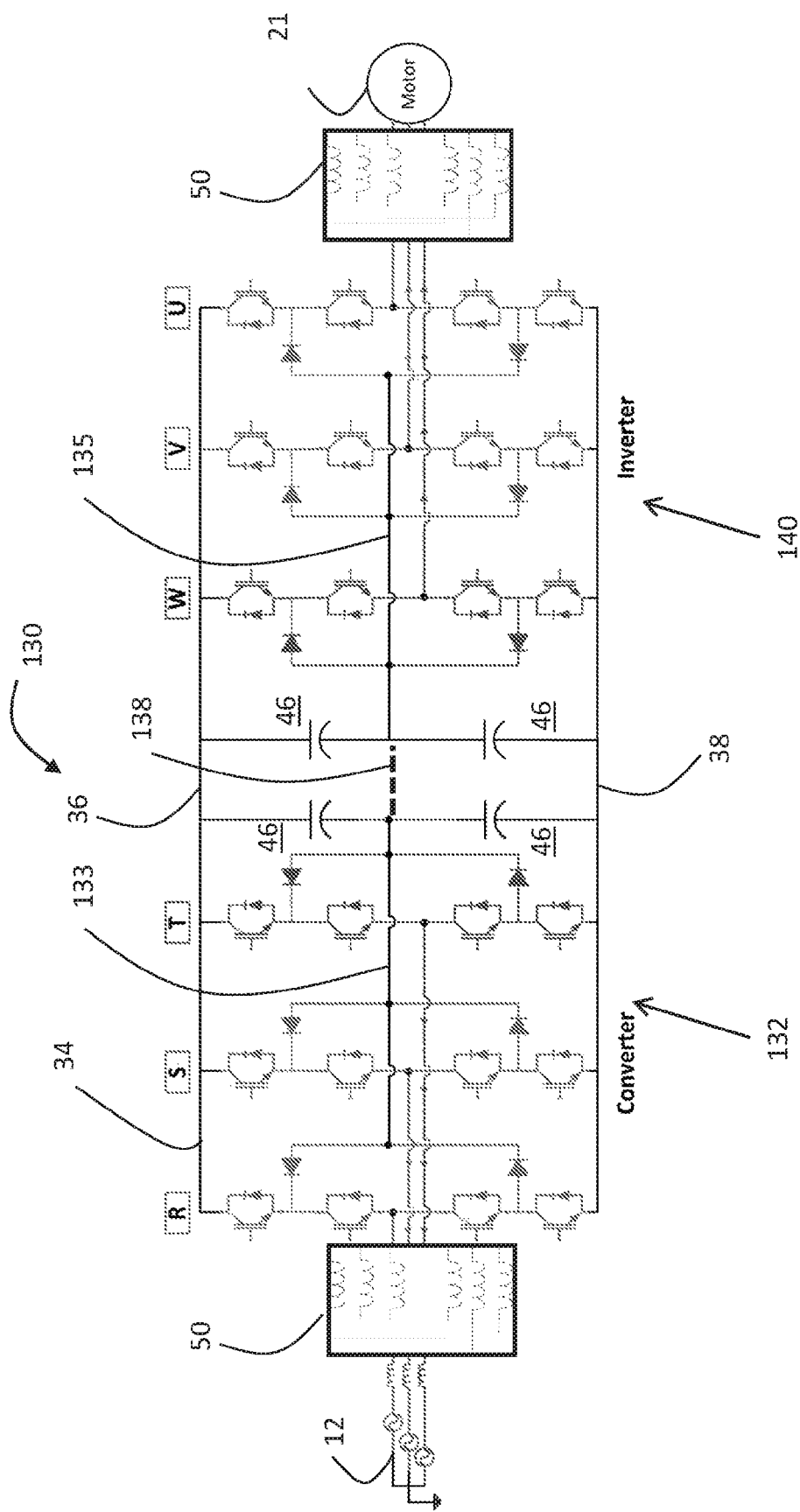
FIG. 5A is a block diagram of a 3 level, 3 phase drive used in an embodiment.

FIG. 5A is a block diagram of a 3 level, 3 phase drive 130 used in an exemplary embodiment. Drive 130 includes a converter 132 having 3 phase legs, R, S and T. Each phase leg, R, S, and T, includes switches controlled by control signals from a drive controller to convert AC power to DC power across a first DC bus 34 (e.g., positive terminal 36 and negative terminal 38). Converter 132 is a neutral point clamped (NPC) converter, in which the neutral points in each phase leg R, S, and T are connected at a common, converter neutral point 133. Drive 130 includes an inverter 140 having 3 phase legs, W, V, and U. Each phase leg, W, V, and U, includes switches controlled by control signals from a drive controller (e.g., 60 of FIG. 3) to convert DC power across the DC bus 34 to AC drive signals to power motor 21. Inverter 140 is a neutral point clamped (NPC) inverter, in which the neutral points in each phase leg W, V, and U are connected at a common, inverter neutral point 135. An optional neutral point link 138 may be used to electrically connect the converter neutral point 133 to the inverter neutral point 135.

Figure 5B:
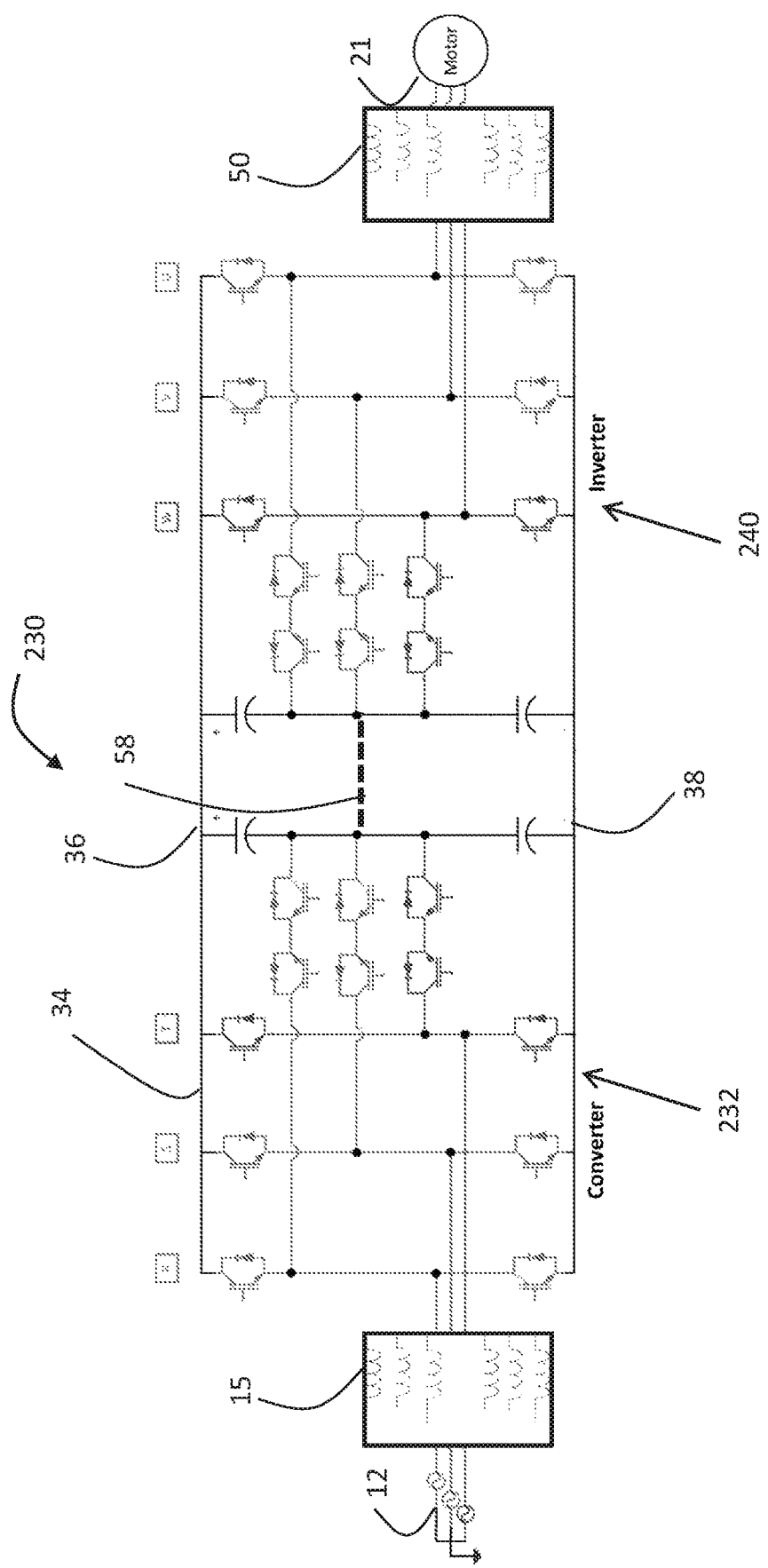
FIG. 5B is a block diagram of a 3 level, 3 phase drive used in an embodiment.

FIG. 5B is a block diagram of a 3 level, 3 phase drive 230 used in an exemplary embodiment. Drive 230 includes a converter 232 having 3 phase legs, R, S and T. Each phase leg, R, S and T, includes switches controlled by control signals from a drive controller to convert AC power to DC power across a first DC bus 34. Converter 232 is a T-type converter. Drive 230 includes an inverter 240 having 3 phase legs, W, V, and U. Each phase leg, W, V, and U, includes switches controlled by control signals from a drive controller to convert DC power across the DC bus 34 to AC drive signals to power motor 21. Inverter 240 is a T-type inverter. An optional neutral point link 238 may be used to electrically connect a converter neutral point to an inverter neutral point.

Figure 5C:
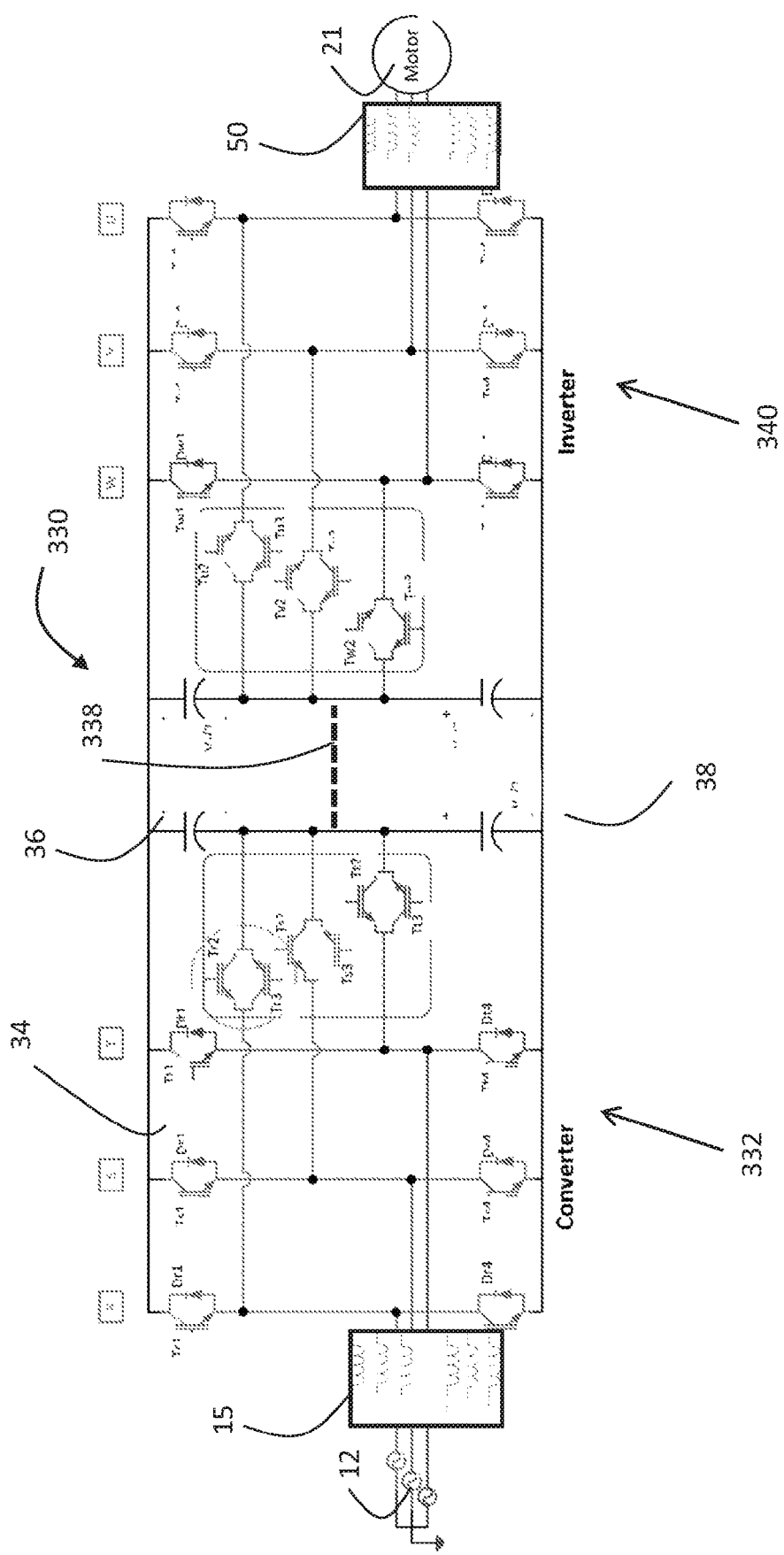
FIG. 5C is a block diagram of a 3 level, 3 phase drive used in an embodiment.

FIG. 5C is a block diagram of a 3 level, 3 phase drive 330 used in an exemplary embodiment. Drive 330 includes a converter 332 having 3 phase legs, R, S and T. Each phase leg, R, S and T, includes switches controlled by control signals from a drive controller to convert AC power to DC power across DC bus 34. Converter 332 is an AT-type converter. Drive 330 includes an inverter 340 having 3 phase legs, W, V, and U. Each phase leg, W, V, and U, includes switches controlled by control signals from a drive controller to convert DC power across the DC bus 34 to AC drive signals to power motor 21. Inverter 340 is an AT-type inverter. An optional neutral point link 338 may be used to electrically connect a converter neutral point to an inverter neutral point.

Figure 6:
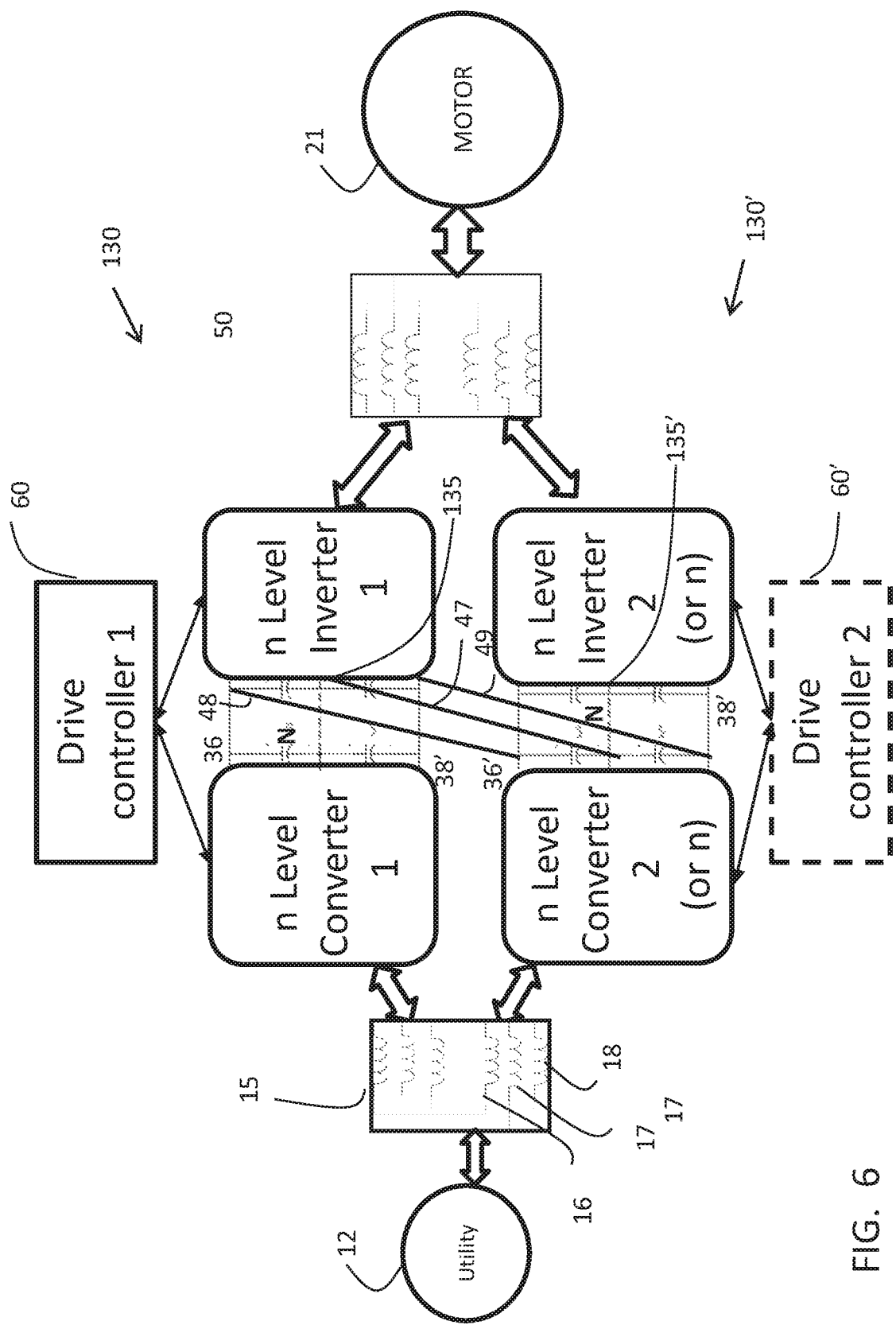
FIG. 6 is a block diagram of an n-level drive system including paralleled drives in accordance with an embodiment.

FIG. 6 is a block diagram of a drive system including paralleled drives analogous to that depicted in FIG. 3 but employing multilevel converters and inverters. In an embodiment, as shown in FIGS. 5A-C, two drives 130, (230, 330) and 130' (230', 330') are connected in parallel to provide drive signals to motor 21. Hereinafter references to the other configurations of the drives will be left off for simplification. It will be understood that reference to a drive could include any of drives 30, 130, 230, and 330 and their respective components. Once again, each drive 130 and 130' may be controlled by a single controller 60. In an embodiment each drive 130 and 130' are controlled by a separate drive controller, 60 and 60', respectively. Drive controllers 60 and 60' provide control signals to the drives 130 and 130', respectively, to control generation of the drive signals to motor 21.

Drives 130 and 130' are 3 level, 3 phase drives, such as that shown in FIGS. 5A-5C. Drives 130 and 130' are placed in parallel by DC bus coupling 48 electrically connecting the positive terminal 36 of DC bus 34 of drive 130 to the positive terminal 36' of DC bus 34' of drive 130' DC bus coupling 49 electrically connects the negative terminal 38 of DC bus 34 of drive 130 to the negative terminal 38' of DC bus 34' of drive 130'. Neutral point coupling 47 electrically connects the bus neutral point of drive 130 with the bus neutral point of drive 130'. Further, for multilevel drives the bus neutral points, the converter neutral points and the inverter neutral points may be electrically connected. In an embodiment the converter neutral point 133, (233, 333) of drive 130 is connected to the converter neutral point 133', (233', 333') of drive 130'. Capacitors 46 and 46' (See FIG. 5) are placed across a first DC bus 34 with a positive terminal 36 and a negative terminal 38 and a second DC bus 34' with a positive terminal 36' and a negative terminal 38', respectively.

Alternatively, the inverter neutral point 135, (235, 335) of drive 130 is connected to the inverter neutral point 135', (235', 335') of drive 130'. Moreover, in another embodiment, the inverter neutral point 135, (235, 335) of drive 130 is connected to converter neutral point 133, (233, 333) with connection 138, 238, 338. Further yet, the inverter neutral point 135', (235', 335') of drive 130' is connected to converter neutral point 133', (233', 333') with connection 138', 238', 338' (not shown for simplicity). Alternatively, in other embodiments, the connection 138, (138') between the inverter neutral point 135 of drive 130 to the converter neutral point 133 of drive 50' may be eliminated, and only the DC buses connected between drives 50 and 50'.

Figure 7A:
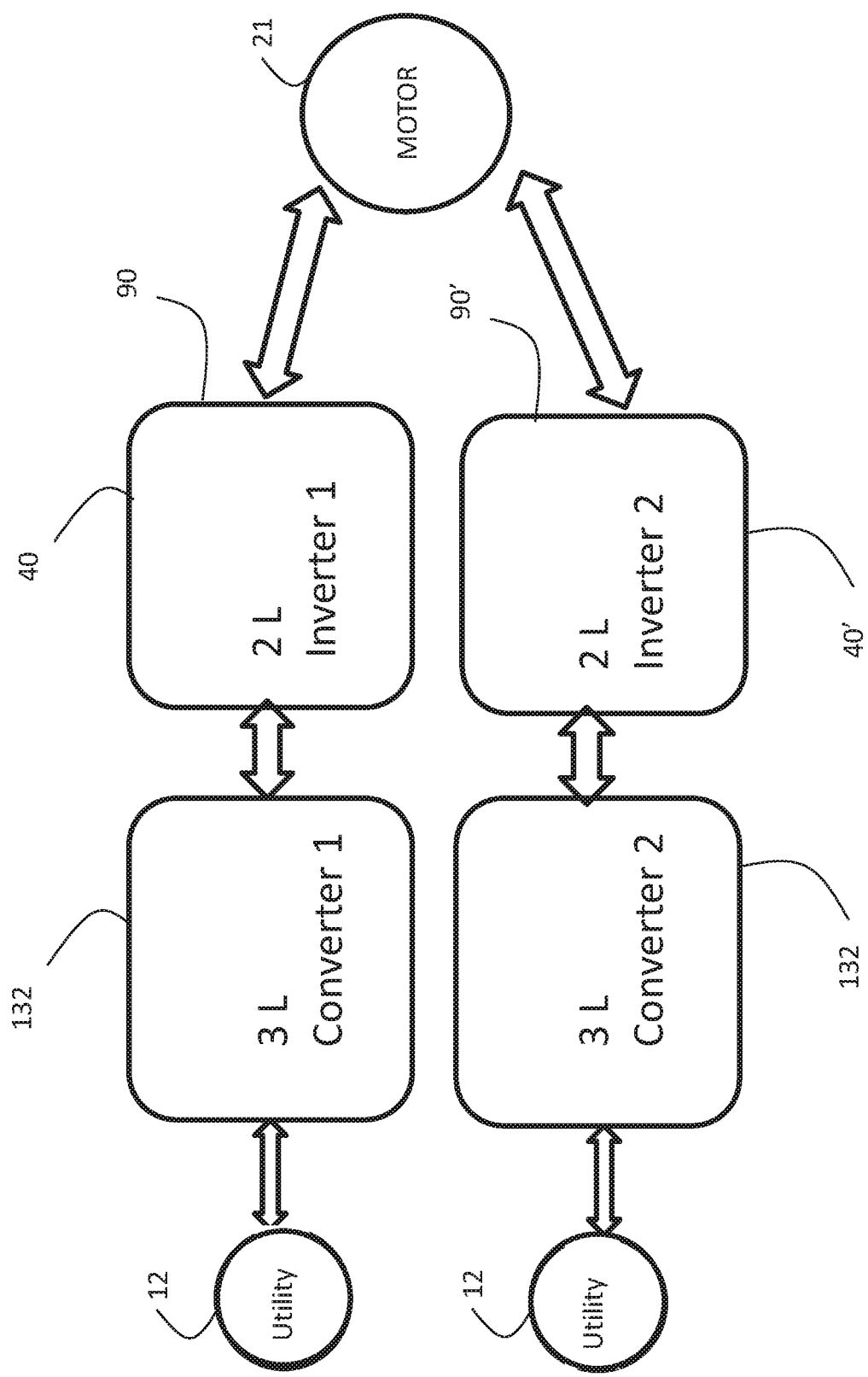
FIG. 7A is a block diagram of a drive system including paralleled drives in an embodiment.
Figure 7B:
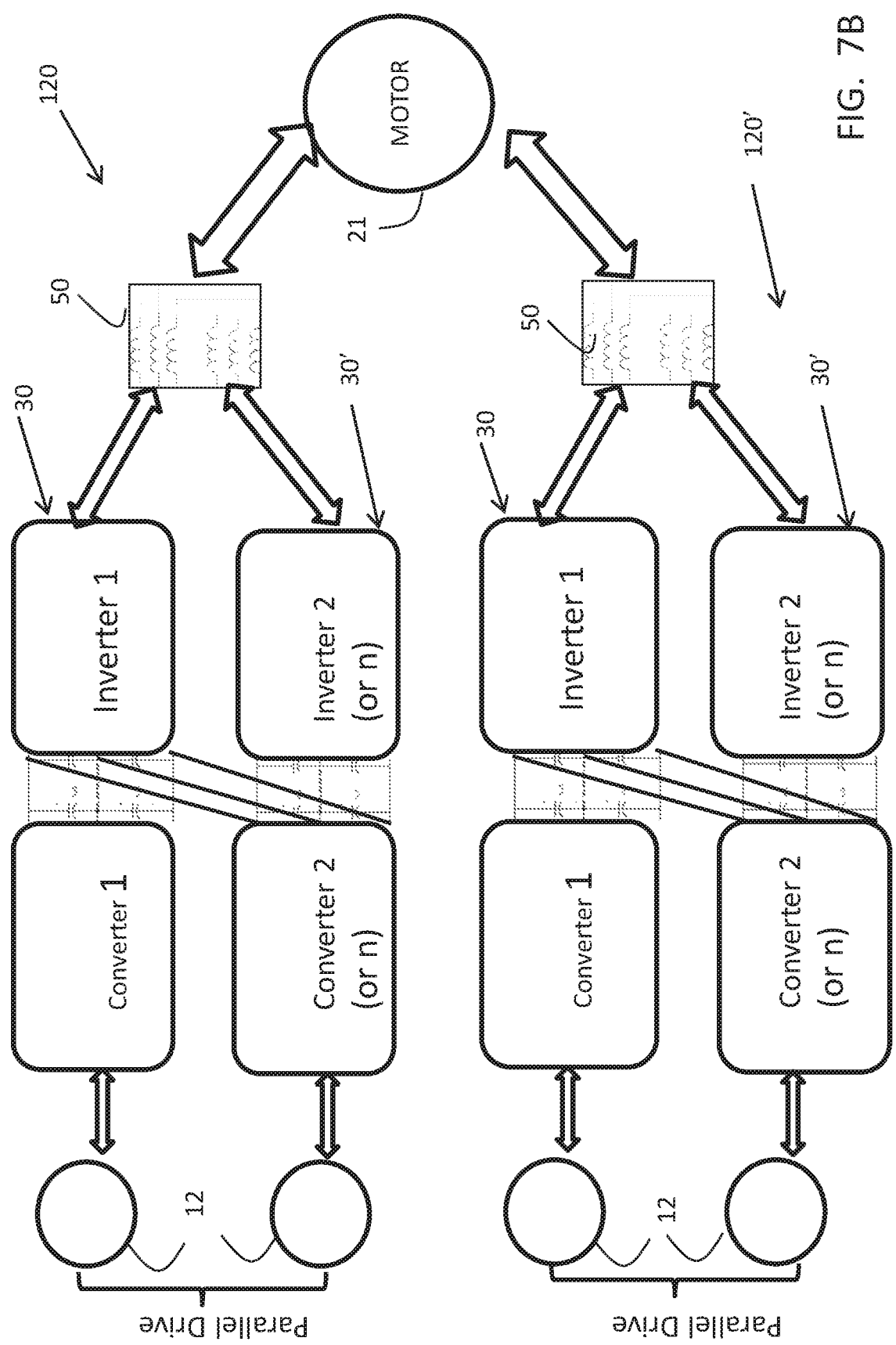
FIG. 7B is a block diagram of a drive system including paralleled drive systems each including parallel drives in accordance with an embodiment.

FIG. 6 is a block diagram of a drive system including paralleled drives in an exemplary embodiment. Drive controllers 60 and 60' may be used in the embodiments of FIGS. 7A-7C to control drives 90, 120, 400 and 90', 120'. FIG. 7A depicts the use of hybrid drives 90 and 90', where the converter sections are 3 level, 3 phase converters 132, 232, 332) and the inverter sections are 2 level, 3 phase inverters 40. FIG. 7A also depicts an architecture that does not use an inductive interface 70. In FIG. 7A, motor 21 is a 6 phase motor. Each phase of the 3 phase drive signals from drives 90 and 90' is connected to an individual phase of motor 21. Motor 21 may have two (or four) sets of galvanic electrically isolated windings sharing the same stator and generating torque on a common rotor. This architecture can be expanded by adding additional drives and using a motor with a higher number of phases (e.g., 3 three-phase drives with a 9 phase motor, 4 three-phase drives with a 12 phase motor). FIG. 7B is a block diagram of an architecture including paralleled drive systems, each including parallel drives, in an exemplary embodiment. FIG. 7B depicts the use of multiple drive systems 120 and 120', each including parallel drives 30 and 30'. Drive controllers 60 and 60' may be used in the embodiment of FIG. 7B to control drives 30 and 30'. In the example of FIG. 7B, two drive systems 120 and 120' (each similar to that in FIG. 3 or 6) are used to power a 6 phase motor 21. Each drive system 120 and 120' generates a 3 phase drive signal output, where each phase is applied to a winding of motor 21. Motor 21 may have sets of galvanic electrically isolated windings sharing the same stator and generating torque on a common rotor. It is understood that other drive systems may be used in parallel, and embodiments are not limited to the drive system of FIGS. 3, 5A-5C, or 6. Each drive system 120 and 120' may employ control signal synchronization as described later herein with reference to FIGS. 8-10. This architecture can be expanded by adding additional drive systems 120 and using a motor with a higher number of phases (e.g., 3 drive systems with a 9 phase motor, 4 drive systems with a 12 phase motor). In general terms, the system may include N drive systems, with a motor being 3N phase motor.

Figure 7C:
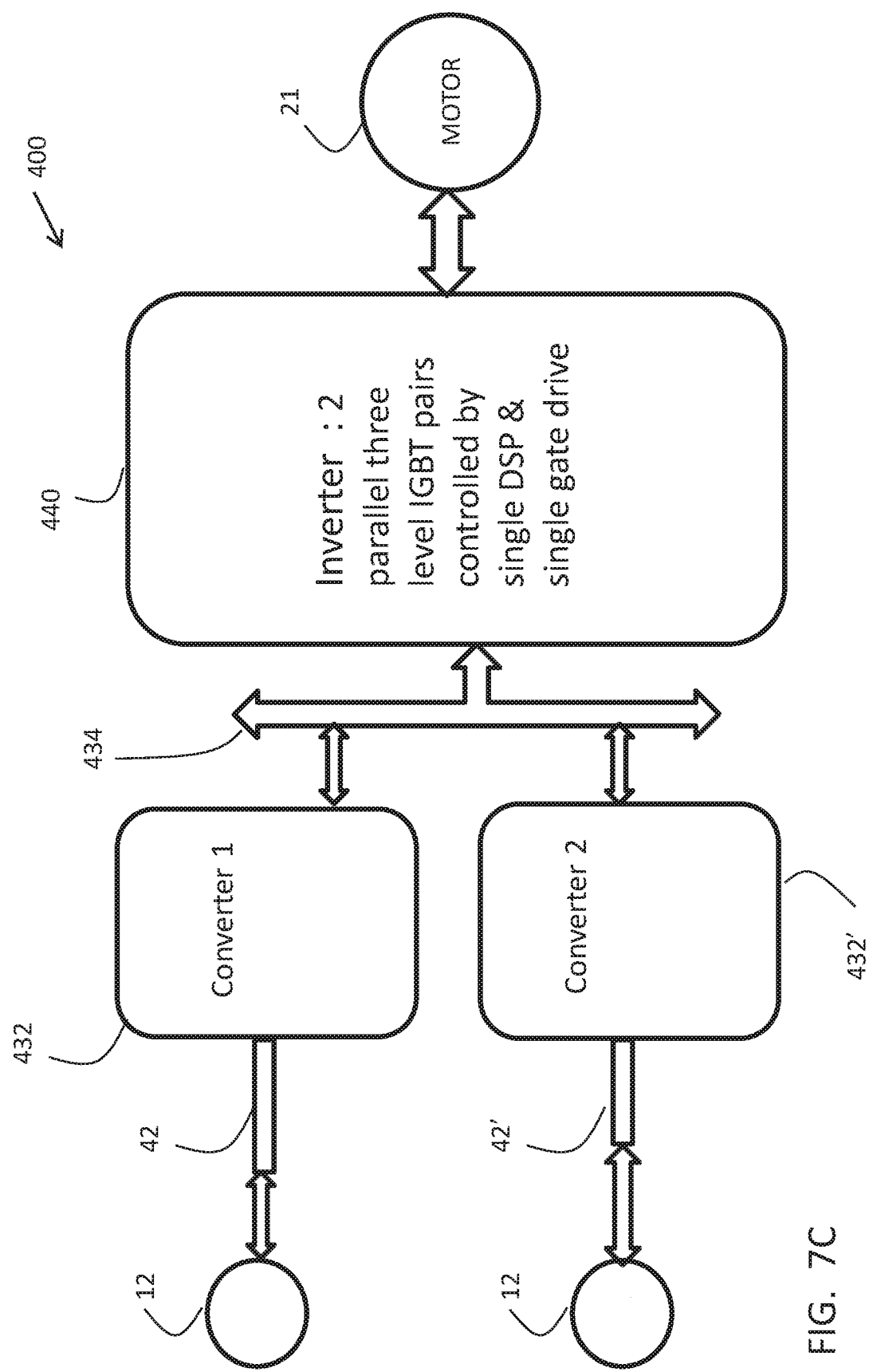
FIG. 7C is a block diagram of a drive system including paralleled converters in accordance with an embodiment.

FIG. 7C is a block diagram of a drive system including paralleled converters and paralleled inverters 400 in an exemplary embodiment. AC power 12 is provided to separate reactors 42 and 42' and then to converters 432, and 432'. The output of converters 432 and 432' is supplied to a DC bus 434, which parallels the positive and negative DC outputs from converters 122 and 122'. An inverter 440 is made up of two parallel, 3 level IGBT inverters controlled by a single controller and single gate drive. The inverters use identical or nearly identical IGBTs, and thus may be controlled by a single controller and gate drive signal, applied to the IGBTs in parallel. As stated previously, the 3 phase motor excitation signals from drives 30 (130, 230, 330) and 30' (130', 230', 330') are connected to an inductive interface 50, which combines each respective phase from the drives 30 and 30' through inductive elements to drive the motor 21. Normal PWM Turning now to FIG. 8, where a control methodology 500 for the paralleled drive 20 is depicted. For simplicity, reference is made to drives 30 and 30' and there subsequent elements, while it should be appreciated the description may be equally applicable to the other embodiments with drives 130, 130' and so on. In the various embodiments, reference will be made to controlling both the converters 32 and 32' as well as the inverters 40 and 40'. In some embodiments the types of control are the same for the primary drive 30 as well as the paralleled drive 30'. In other instances there are differences to facilitate the various techniques of synchronization for the inverters 40 and 40' the control of the converter 32 or the paralleled converter 32', or the use of a single controller 60.

In an embodiment, to control the when the converter 32 or the paralleled converter 32' when they are connected as in FIG. 3, FIG. 6, or FIG. 7B the control method employed is to simply operate them together, where synchronization is desirable, but not always necessary. In some embodiments, the synchronization may be the same as employed for the inverters 40 and 40' as described in the several embodiments below. For example with respect to the topology depicted in FIG. 4, the control methods employed may be the same as that employed for the inverters 40 and 40. This variant also allows the interleaving, as a means to expand current/power capability. That is the converters 32 and 32' operating or conducting current to charge the DC bus at opposing times. This approach limits inrush currents and switching device currents in the converters for any topology employed. In another embodiment it may be desirable to control the converters 32 and 32' such that one converter, e.g., converter 1 32 controls/supplies the dc bus 36 while the other controller only works in current control mode with the same current reference for the one that controls the dc bus 36. Likewise for the other for converter 2 32' when it supplies the DC bus 36'. That is, the converter has two main functions: first to regulate the dc bus to a constant value, usually 750V for typical larger motor drives, and second, regulate the current that achieves regulation of the dc bus. In a parallel converter applications as with the embodiments described, one of the converters (32 or 32') may take the function of regulating the dc bus voltage. The current needed for this function is shared between two converters. One takes half of the load while the other takes the other half. It will be appreciated that both cannot readily handle the task of regulating the DC bus without additional precautions as they may opposed one another. In some embodiments the converters 32 and 32' are totally independent and controlled independently, for example, the topology employed in FIG. 7A. It should be appreciated that in some embodiments the control schemes for the converters 32 and 32' may be linked to the control scheme of the inverters 40 and 40'. The control scheme employed may depend on the particular drive 30, 30' topology employed, the configuration of the system and selected design constraints. For example, if limiting the inrush current is desired, timing the converters to interleave is desirable. If limiting the voltage constraints of some of the drive switching devices is important other drive topologies may be desirable.

Figure 9:
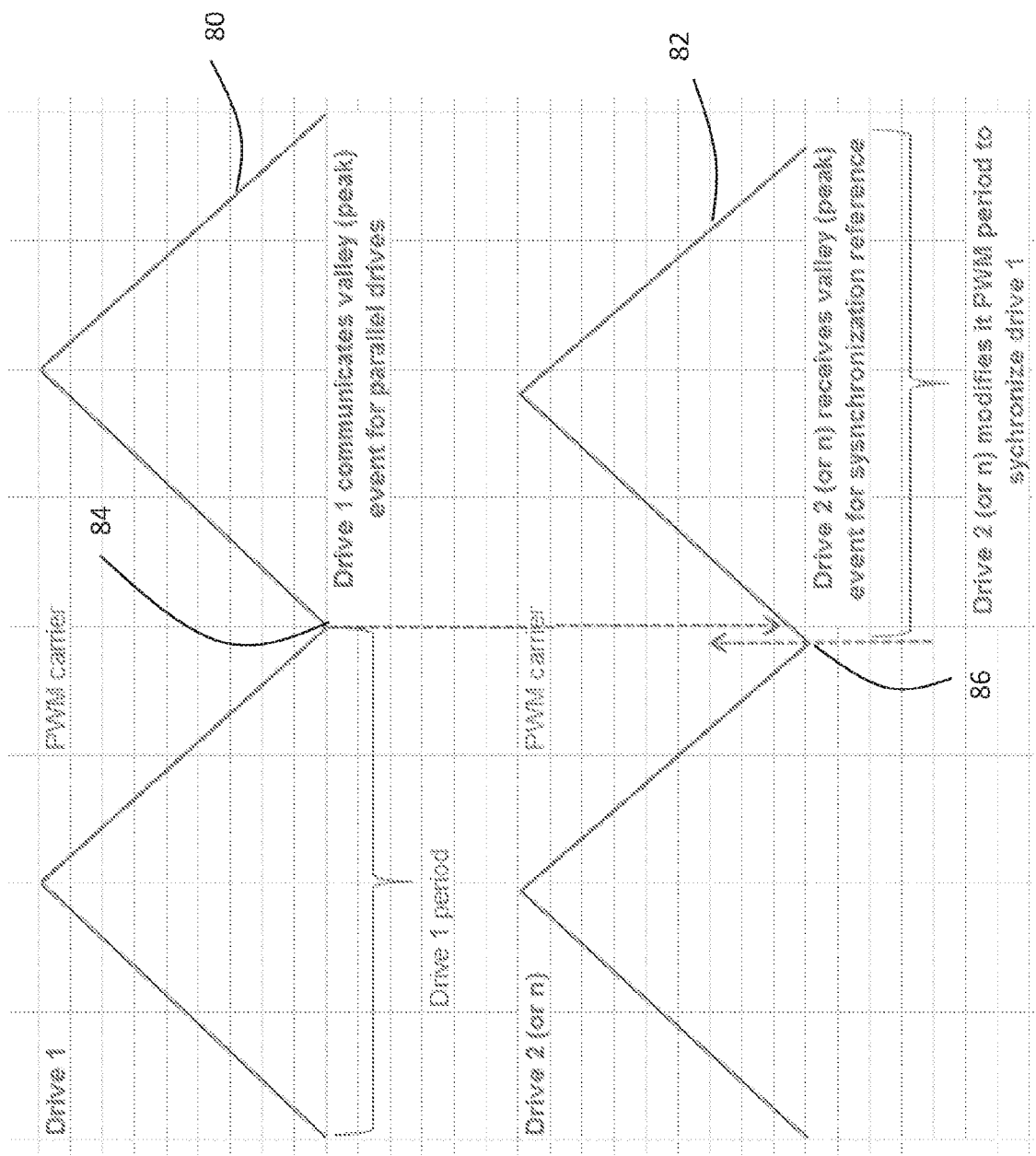
FIG. 9 depicts synchronization of control signals between a first drive and a second drive in an embodiment.

To facilitate combining the drive output signals of separate drives (e.g., 30, 30') at the inductive interface 50, it is beneficial that the drive signals at the output of the drives be synchronized. Due to variations in the components, switching devices, drive controllers 60, 60' the converters 32 and 32' and inverters 40, 40', using identical control signals 63, 63' or 62, 62', (or 65 and 64 if a single controller 60 is employed) may not result in synchronized outputs U, V, and W with U', V', and W' from the drives 30, 30'. To simplify the description reference will be made primarily to the methods employed for controlling the inverters 40, and 40'. As stated above, similar methods or a combination of methods may be employed for the converters 32 and 32'. In order to aid in synchronizing the outputs from two or more drives e.g., 30, 30', drive controllers 60 and 60' execute a methodology 500 to align the control signals 62, 62' (FIG. 3) provided to the respective drives 30, 30', and in particular the inverters 40, 40'. FIG. 9 depicts a first pulse width modulation (PWM) signal 80 for generating the control signals 62 from drive controller 60 for one phase (e.g., any of U, V, or W) of the inverter 40 of drive 30, for example, and a second PWM signal 82 for generating a second control signal 62' from drive controller 60' (or 64 if a single controller 60 is employed) for one phase (e.g., any of U', V', or W' but corresponding to the PWM signals 80 and 82 above respectively) of the inverter 40' of drive 30', for example. It should be noted, that the control signals 62, 62' are ideally identical and that variations between the control signals 62, 62' are small and designed to address variations in components, timing, and the like. In operation, at process step 205 a reference point 84 of the first PWM signal 80 is defined. As shown in FIG. 9, the reference point 84 is a minimum value of the PWM signal 80, however, any reference point may be used.

During operation, as depicted at process step 210, first drive controller 60 communicates to the second drive controller 60' when the reference point 84 has occurred in PWM signal 80. Second drive controller 60' then determines when the reference point 86 occurs in its PWM signal 82. If there is a difference between when the reference point 84 occurs in the first PWM signal 80 and when the reference point 86 occurs in the second PWM signal 82, then one or both of the drive controllers 60 and 60' may adjust the period of the PWM signals 80, 82 such that the reference points 84, 86 occur at the same time as depicted at process step 515. It should be noted that process steps 510 and 515 are depicted as dashed because they are optional for other embodiments disclosed herein. The first drive controller 60 or second drive controller 60' may use known techniques to adjust the period of the PWM signals 80, 82, such as a phase locked loop technique to reduce error between when the reference points 84 occurs in control signal 80 and when the reference point 86 occurs in control signal 82. This improves synchronization of the control signals 62, 62' between inverters 40 and 40' for drives 30 and 30', which allows smaller inductive elements to be used in inductive interface 50. The control signal synchronization as described may be used with any number of drives, and is not limited to two drives. The control signal synchronization of FIG. 5 may be used with the drives other than those shown in FIG. 3 or 6.

The control signals 62, 62' generated by the controller 60, 60' may be pulse width modulation (PWM) signals, commonly used in n-level drives and many inverter control applications. In conventional PWM, the duty cycle of the control signals 62, 62' is varied as required based on the output current requirements of the load as depicted at process step 520. For example, the desired duty cycle is generated by a motor control demand, commonly a current and speed value. In many applications the speed value dominates the commanded duty cycle while the current value may have a smaller contribution. For example, if more speed or torque is required in by the motor 21, the pulse width of the control signals 62, 62' is increased, thereby the switching devices of the inverter 40, 40' remain on for a commensurate duration and directing more current to the motor 21. Likewise, if a reduction in the speed or output current from the drive 30, 30' is needed, the duty cycle of the control signals 62, 62' is decreased by the controller 60, 60'. Therefore, employing the described techniques, the synchronization between the controllers 60, 60' and the commands to the inverters may be accomplished as depicted at process step 530. In addition, using the duty cycle control with the control signals 62, 62' facilitates accurate control of the motor excitation signals U, V, and W.

Combined Control Single Controller

Figure 8:
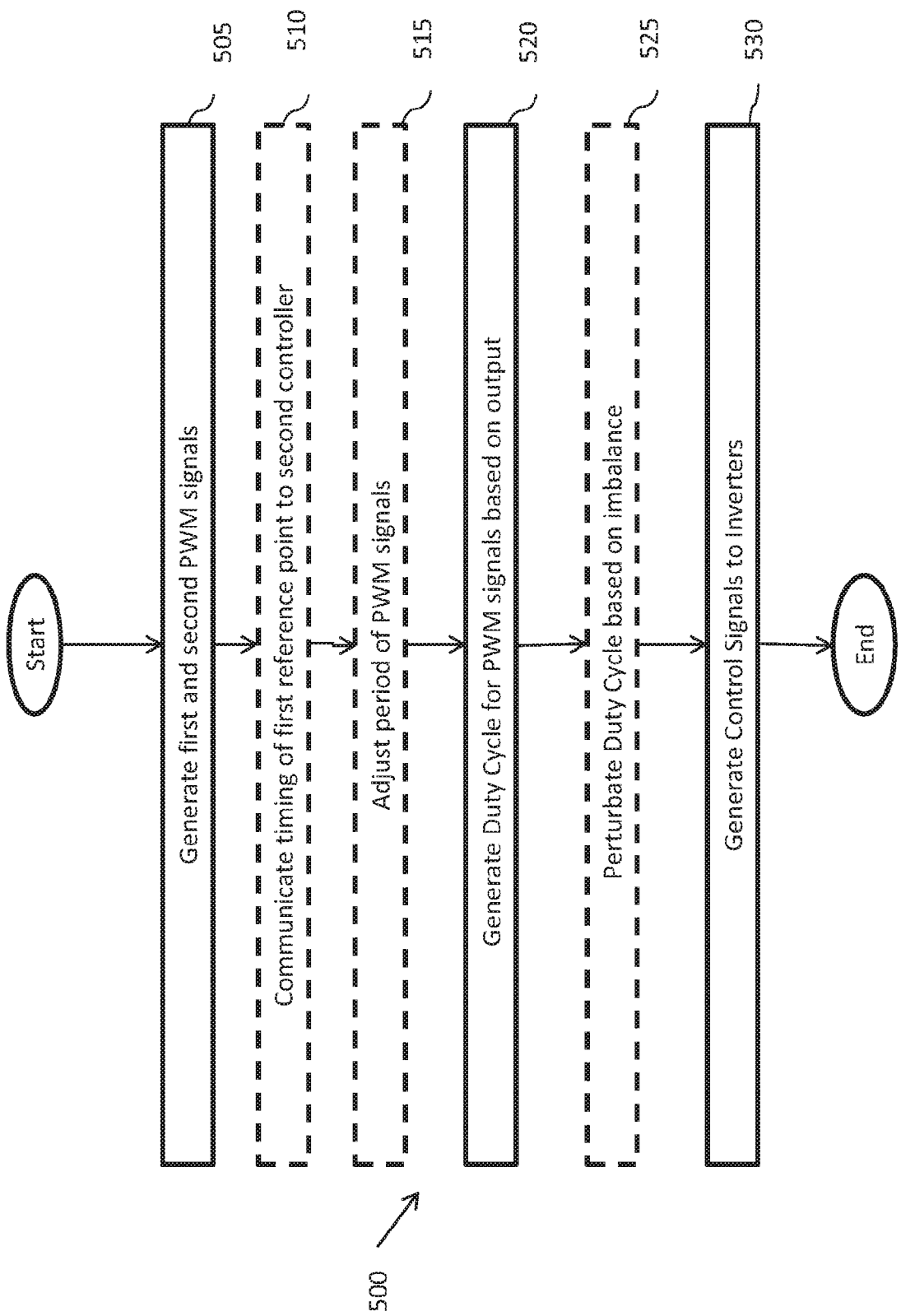
FIG. 8 depicts a flowchart of a method of controlling a paralleled drive in accordance with an embodiment.

Continuing with FIGS. 8 and 9 in another embodiment, an alternative control methodology is described in concert with a different topology for the drive 130 (and the other embodiments). In this embodiment, a single controller (usually a DSP or microcontroller) 60 is employed. In this embodiment because the same controller 60 is generating the control signals 63, 65, 62, and 64 for the two converters 32, and 32' as well as the two inverters 40 and 40' no special synchronization in required (as it is inherent to being generated by the single controller 60). That is, because the control signals 63, 65, 62, and 64 to the converters 32, 32', and inverters 40, 40' are generated in the same controller 60, there are no delays between controllers, in wiring, and the like, and synchronization techniques are not needed. In an embodiment, the controller 60 executes a process similar as described above for the first drive 30 and converter 32. However, in this instance, controller 60 provides a second set of control signals 65 also from drive controller 60 that are essentially the same as the first. In fact, in an embodiment, they are the same. In another embodiment the control signals 63, 65 are different, with one controller suppling the DC buses 36 or 36' while the other is not. In an embodiment, the controller 60 executes a process similar as described above for the first drive 30 inverter 40. However, in this instance, controller 60 provides a second set of control signals 64 also from drive controller 60 that are essentially the same as the first 62. In fact, in an embodiment, they are the same. Once again the control signals 63, 65, 62, and 64 may be pulse width modulation signals, commonly used in n-level drives as described in the earlier embodiments.

During operation, the first drive controller 60 may use conventional pulse width modulation techniques to control the duty cycle (on time) of the control signals 60, 64 to the inverters 40 and 40' and thereby the current provided by the inverters 40 and 40'. This technique is very simple because no synchronization is needed or required when the commands for the two inverters 40 and 40' are made from the same controller. However, in this configuration, while simple from controller configuration, it would not address any corrections needed to ensure that inverter 40 and 40' equally share the current load. Unfortunately, then, any imbalance would be uncompensated. In addition, any imbalance would cause the inductive interface 50, and in particular, interphase inductors 52, 54, 56 to carry the additional burden of the imbalance between current outputs of the inverters 40 and 40'. Excessive imbalance could cause the interface inductors 52, 54, 56 to lose their ability to block circulating currents due to core saturation, thus requiring larger inductors to remain effective.

Combined Control Single Controller with Perturbation

To address this consideration and any potential imbalance in the current outputs of the inverter 40 when compared to 40', in an embodiment another methodology for generating the inverter control signals 62, 64 from the controller 60 is disclosed. In this embodiment, similar to the embodiment above, once again a single controller 60 is employed. Once again as described above, conventional PWM duty cycle control technique may be employed to formulate the control signals 62, 64 to the inverters 40 and 40'. Moreover, as described above, this scheme may optionally be employed for the converters 32 and 32', or further yet an alternative method as described herein. In this instance, however, to address the imbalance conditions identified above, beyond the duty cycle required to address the desired operation, a small variation or perturbation to the commanded duty cycle for each of the control signals 62, 64 to the inverters 40 and 40' is introduced as depicted at optional process step 525 of FIG. 8. The amount of perturbation required is small, only sufficient to overcome sharing imbalances between the two drives 40 and 40'. In an embodiment, the perturbation is on the order of <1-2% of the duty cycle for the control signals 62, 64. The variation or perturbation is introduced in a complementary in nature, that is, if for one inverter, e.g. inverter 40, the perturbation is an increase in nominal duty cycle for the control signal 62, for the other inverter e.g., 40' the perturbation is a reduction in duty cycle of the control signal 64. Likewise, if the variation or perturbation for inverter 40 is decrease the nominal duty cycle of the control signal 62, then for the other inverter e.g., 40' the perturbation is an increase duty cycle of the control signal 64. In this manner, any imbalance in the current output of the inverter 40 versus 40' may be reduced or eliminated while maintaining the overall desired duty cycle required and thereby the commanded excitation signals (U, V, and W as well as U', V', W') to the motor 21 to achieve the desired response. Advantageously this approach reduces the impact of current sharing imbalance on the two inverters 40 and 40' and thereby the impact on the interphase inductors 52, 54, and 56. This approach also minimizes the requirements on the interphase inductors 52, 54, and 56 as the net core flux in each under balanced condition is zero and hence core material can be reduced.

Out of Phase

Figure 10:
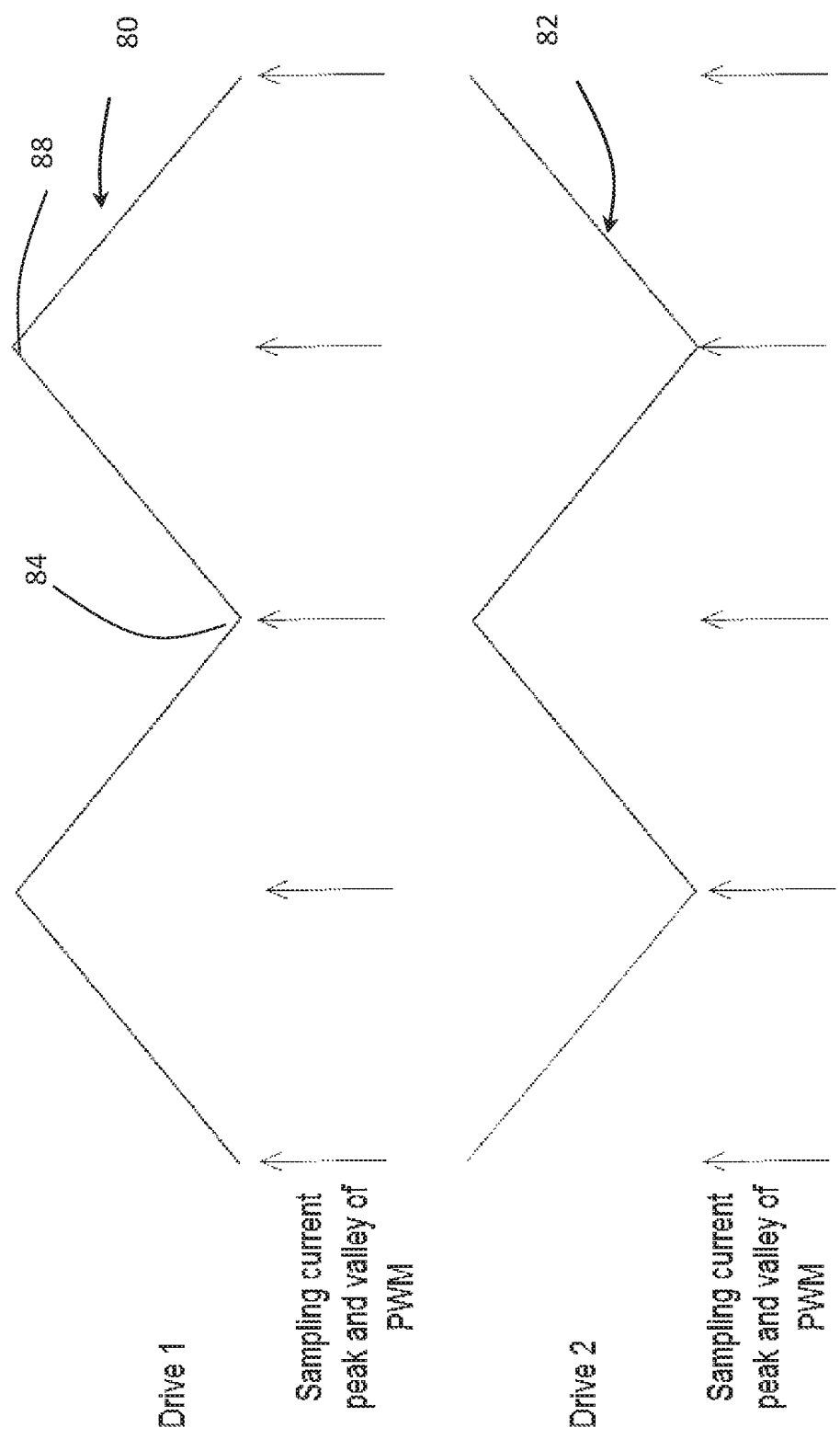
FIG. 10 depicts synchronization of control signals between a first drive and a second drive in another embodiment.

Continuing with FIG. 9 and now with references to FIG. 10, in another embodiment, another control methodology is described. To facilitate combining the drive output signals of separate drives (e.g., 30, 30') at the inductive interface 50, once again, it is beneficial that the drive signals at the output of the drives be synchronized to minimize the required inductive interface. It will be appreciated as mentioned above that there are many reasons that despite employing identical commands, the control signals 60, and 62 to the inverters 40 and 40' may not be synchronized. In an embodiment in order to aid in synchronizing the outputs from two or more drives e.g., 30, 30', drive controllers 60 and 60' execute another process similar to that described above to align, the control signals 62, and 62 provided to the respective drives 30, 30', and in particular the inverters 40, 40'. Moreover, as described above, this scheme may optionally be employed for the converters 32 and 32', or further yet an alternative method as described herein. FIG. 7 depicts one period of a first PWM signal 80 from drive controller 60 for one phase (e.g., any of U, V, or W) of the inverter 40 of drive 30 just as described for earlier embodiments. Once again second PWM signal 82 from drive controller 60' (or 64 if a single controller 60 is employed) for one phase (e.g., any of U', V', or W' but corresponding to the PWM signal 80 above) of the inverter 40' of drive 30' is depicted. However, in this embodiment, it should be noted that the second PWM signal 82 is defined to be 180 degrees out of phase with the first control signal 80. The PWM signals 80, 82 may be pulse width modulation signals, commonly used in n-level drives.

In operation, once again a first reference point 84 of the first PWM signal 80 is defined, similar as to the embodiment described above. As shown in FIG. 10, the first reference point 84 is a minimum value of the PWM signal 80, however, any reference point may be used. In addition, a second reference point 88 is selected. Once again, while a maximum point in the control signal 80 is selected and depicted in the figure, almost any other point could be selected. For simplicity, in processing a maximum, 90 degrees following the first reference point 84 (a minimum) is selected for the second reference point 88. Similar to that described above, during operation, first drive controller 60 communicates to the second drive controller 60' when the first reference point 84 and the second reference point 88 have occurred in the PWM signal 80. Second drive controller 60' then determines when the first reference point 84 and second reference point 88 occurs in its PWM signal 82. If there is a difference, accounting for the 180 degree shift between when the two reference points 84, 86 occur in the first PWM signal 80 and when the two reference points 84, 86 occurs in the second PWM signal 82, then one or both of the drive controllers 60 and 60' may adjust the period of the PWM signals 80 or 82 (and thereby the control signals 62, 62') respectively such that the reference points 84, 86 of the respective PWM signals 80, 82 occur at the same time.

The first drive controller 60 or second drive controller 60' may use known techniques to adjust the period of the drive signal 80, 82, such as a phase locked loop technique to reduce error between when the reference point occurs in PWM signal 80 and when the reference point occurs in PWM signal 82. This improves synchronization of the control signals 62, 62' between inverters 40 and 40' for drives 30 and 30', albeit with the phase difference mentioned above. When synchronized in accordance with this embodiment it allows for less burden and the potential for. In addition, it facilitates a reduced burden on the input interphase inductors 16, 17, 18; (FIG. 3) the DC bus 34, 34' and reactances 42, 42'(FIG. 8) as none or less of the switching devices of the converters 32, 32' or inverters 40, 40' of one drive 30 are demanding current at the same time as the other drive 32'. That is, that that the control signals 62, 62' are interleaved such that one drives demands are offset from the others. An additional advantageous feature of the interleaving control methodology described is that due to the 180 degree shift of the second control signal 86. The apparent frequency of noise, switching, ripple applied to the interphase inductances 52, 54, and 56 and the motor 21 is doubled. As a result, the size the interphase inductors 16, 17, 18 and/or 52, 54, and 56 may be reduced. Alternatively, because of the apparent frequency doubling if the interphase inductances 52, 54, and 56 are maintained at the same size, the frequency of the PWM may be reduced to half. Moreover, the PWM frequency doubling has an additional benefit as it reduces acoustic impact on users. The human ear is less sensitive to higher frequency and the amplitude is reduced by half. Reducing the PWM frequency reduces the switching losses in the switching devices of the inverter 40, 40' depending on the configuration of the drive, the switching losses can be 30 percent of the losses in the switching devices. The control signals 62, 62' synchronization as described may be used with any number of drives, and is not limited to two drives. The control signal 62, 62' synchronization of FIG. 7 may be used with the drives other than those shown in FIG. 3 or 4.

Out of Phase & Single Controller

In yet another embodiment, another control methodology is described. Once again, to facilitate combining the drive output signals of separate drives (e.g., 30/30') at the inductive interface 50, once again, it is beneficial that the drive signals at the output of the drives be synchronized. Moreover, as described above, this scheme may optionally be employed for the converters 32 and 32', or further yet an alternative method as described herein. In this embodiment, once again a single controller 60 is employed as described above. In this embodiment because the same controller 60 is generating the control signals 62, 64 for the two inverters 40 and 40' no special synchronization in required. That is, because the control signals 62, 64 to the inverters 40, 40' are generated in the same controller 60, there are no delays between controllers 60, 60', in wiring, and the like, and synchronization techniques are not needed.

In an embodiment, the controller 60 executes a process similar as described above for the first drive 30 and inverter 40. However, in this instance, controller 60 provides a second set of control signals 64 also from drive controller 60 that are essentially the same as the first. In this embodiment, it should be noted that the second set control signals 64 is defined to be 180 degrees out of phase with the first control signals 62 as described for the interleaving control methodology of the embodiments above. In this instance then using a single controller 60 the synchronization of the control signals between inverters 40 and 40' for drives 30 and 30' is controlled, albeit with the phase difference mentioned above. When synchronized and interleaved in accordance with this embodiment the advantages described above may be realized including allowing for less burden in the rectifier bridge 32, 32', less burden on the DC bus 32, 32' and reactances 42, 44, and 46. In addition, it would readily facilitate the elimination of the second rectifier bridge 32' and reactances 42', 44' as described in an earlier embodiment. An additional advantageous feature of the control methodology described is that due to the 180 degree shift, the apparent frequency doubling permits reducing the size the interphase inductors or alternatively reducing the switching frequency of the PWM to reduce the switching losses in the switching devices of the inverter 40, 40' as described earlier.

Figure 11:
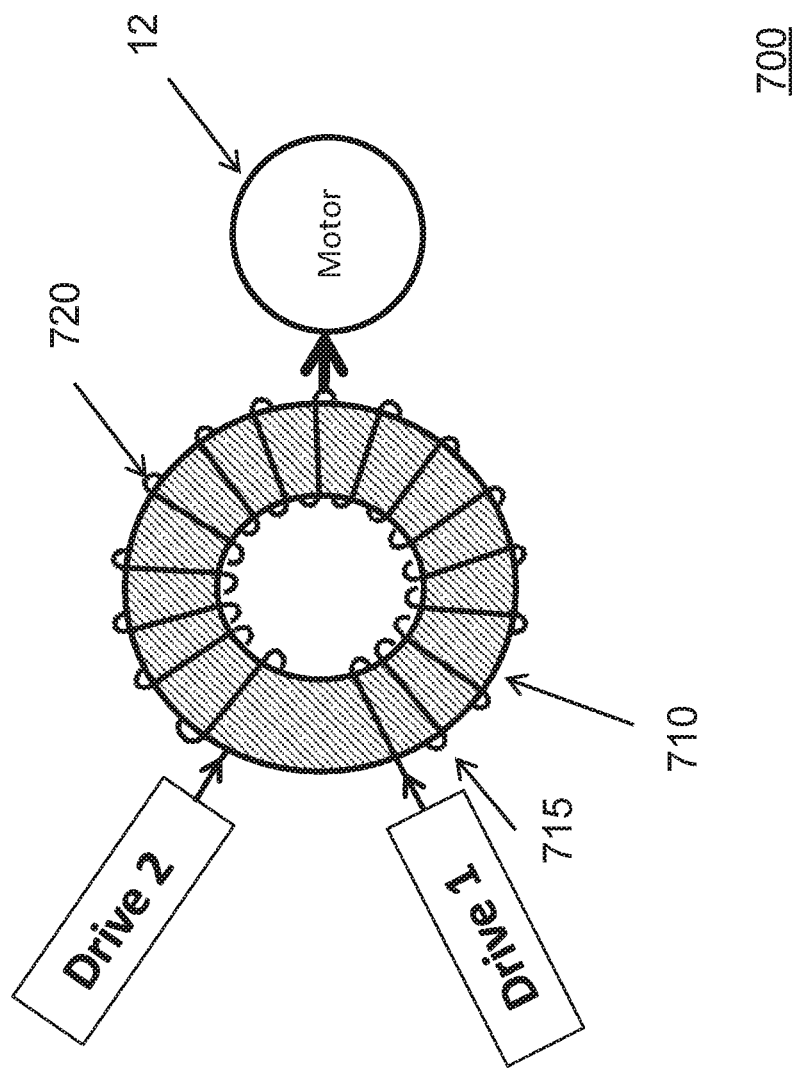
FIG. 11 is a diagram of an interphase inductor in accordance with an embodiment.

FIG. 11 shows the interphase inductor physical structure 700 that includes, but is not limited to, a toroidal core 710. Two equivalent windings 715, 720 with inversed directions are employed with their common point tied to a phase of the motor 12, ideally summing the outputs of the two drive inputs. The interphase inductor flux is generated by the current that goes through both branches, creating canceling flux in the core to benefit minimal voltage drop for fundamental voltage, while the inductance from one drive to the other drive remains to limit the circulating current. Therefore, by controlling equal currents from the drives and by the benefit of interphase inductor the size and also the voltage drop that it could incur in case the currents are not balanced is minimized. It should be appreciated that the actual design of the coupling inductor will most likely still result in some leakage inductance from each drive to the motor. This residual leakage inductance will also function to provide motor surge voltage suppression.

Figure 12:
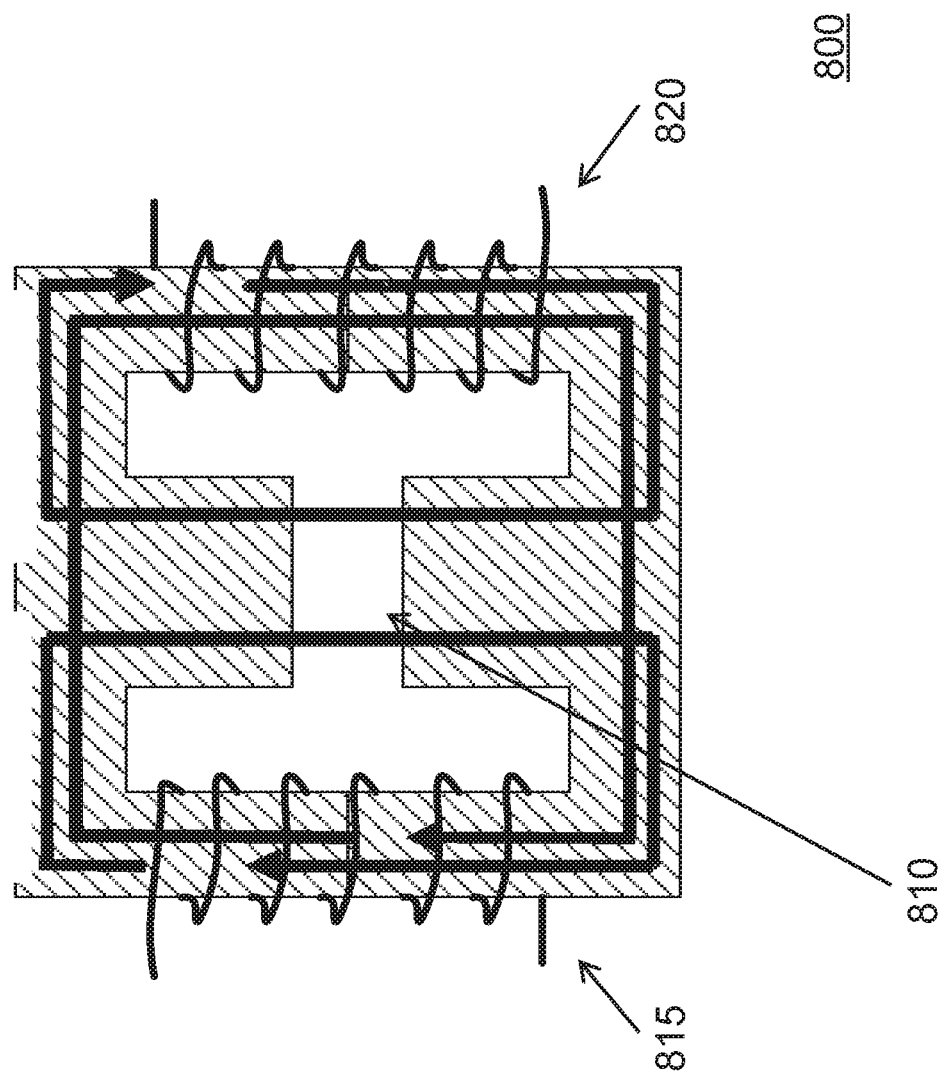
FIG. 12 is a diagram of an interphase inductor in accordance with an embodiment.

FIG. 12 shows another configuration for the interphase inductor physical structure 800 In an embodiment, the implementation of the interphase inductor function could be combined with the function of traditional converter three phase inductor. It is desirable to have this in a compact fashion as depicted in FIG. 12. Note that in FIG. 4, the inductors identified by reference numerals 16, 17, and 18 are interphase inductors while the inductors labeled as R, S, and T are traditional three phase reactors. FIG. 12 show how these two sets of inductors can be combined in one. In other words, FIG. 11 implements only interphase inductor function while (R, S, and T as shown in FIG. 4) implements only traditional converter three phase inductor/reactor function 810. Two equivalent windings 815, 820 with inversed directions are employed with their common point tied to a phase of the motor 12, ideally summing the outputs of the two drive inputs. The interphase inductor flux is generated by the current that goes through both branches, creating canceling flux in the core to benefit minimal voltage drop for fundamental voltage, while the inductance from one drive to the other drive remains to limit the circulating current. Therefore, by controlling equal currents from the drives and by the benefit of interphase inductor the size and also the voltage drop that it could incur in case the currents are not balanced is minimized. It should be appreciated that the actual design of the coupling inductor will most likely still result in some leakage inductance from each drive to the motor. This residual leakage inductance will also function to provide motor surge voltage suppression.

Embodiments include the use of paralleled drives in order to meet high load demands without the need to design or source a single, high power drive. Using parallel drives, and optionally parallel drive systems, allows the drive system to meet load demands through multiple, lower power drives. This eliminates the cost and/or development time associated with a single, higher power drive.

The terminology used herein is for the purpose of describing particular embodiments only and is not intended to be limiting. While the description has been presented for purposes of illustration and description, it is not intended to be exhaustive or limited to the form disclosed. Many modifications, variations, alterations, substitutions, or equivalent arrangement not hereto described will be apparent to those of ordinary skill in the art without departing from the scope of the disclosure. Additionally, while the various embodiments have been described, it is to be understood that aspects may include only some of the described embodiments. Accordingly, embodiments are not to be seen as being limited by the foregoing description, but is only limited by the scope of the appended claims.

The invention claimed is:

1. A three-phase paralleled active front-end drive, comprising:
   a first plurality of interphase inductors configured for connection to a three phase alternating current (AC) power source and operable to distribute power from a three phase alternating current source to a first converter and a second converter configured to transfer power to a first and an second direct current (DC) bus respectively;
   a bus coupler operably coupling the first DC bus to a second DC bus;
   a first inverter operably connected to the first DC bus;
   a second inverter operably connected the second DC bus, the first inverter and second the inverter each configured to provide a plurality of motor excitation signals;
   a first controller operably connected to the first converter and the second converter as well as the first inverter and the second inverter, the first controller configured to generate control signals to cause the first converter and the second converter to transfer power to a first and an second direct current (DC) bus respectively, and the first controller configured to generate control signals to cause the first inverter and the second inverter to generate a plurality of motor excitation signals respectively; and
   a second plurality of interphase inductors operable to combine the plurality of motor excitation signals from the first inverter with the plurality of motor excitation signals from the second inverter.

2. The three-phase paralleled active front-end drive of claim 1, further comprising a second controller wherein the first controller and the second controller implement a method to cause the first inverter and the second inverter to provide substantially equal motor excitation currents respectively.

3. The three-phase paralleled active front-end drive of claim 2, wherein:
   the first controller generates a first pulse width modulation (PWM) reference signal and the second controller generates a second PWM reference signal;
   the first controller and the second controller each generate a duty cycle for the control signals based on the first PWM reference signal and second PWM reference signals respectively,
   the first controller generates a first set of control signals to the first inverter and the second controller generates a second set of control signals to the second inverter based on the first PWM reference signal and second PWM reference signals respectively.

4. The three-phase paralleled active front-end drive of claim 3, further including the first controller communicating timing of a reference point on the first reference to the second controller, the second controller adjusting a period of its PWM reference signal based on the timing.

5. The three-phase paralleled active front-end drive of claim 4, further including at least one of the first controller and the second controller perturbating a duty cycle of at least one of the first set of control signals and the second set of control signals based on at least one of the first PWM reference signal and second PWM reference signals.

6. The three-phase paralleled active front-end drive of claim 3, wherein the second PWM reference signal is 180 degrees out of phase from the first pulse width modulation (PWM) reference signal.

7. The three-phase paralleled active front-end drive of claim 1, wherein the first inverter and the second inverter comprise at least six switching devices.

8. The three-phase paralleled active front-end drive of claim 1, wherein each interphase inductor includes a pair of windings and is configured to control a circulation current of the three-phase paralleled active front-end drive.

9. The three-phase paralleled active front-end drive of claim 1, wherein the first controller is configured to implement a method to cause the first inverter and the second inverter to provide substantially equal motor excitation currents respectively.

10. The three-phase paralleled active front-end drive of claim 9, wherein
    the first controller generates a first pulse width modulation (PWM) reference signal and a second PWM reference signal;
    the first controller generates a first set of control signals to the first inverter and a second set of control signals to the second inverter based on the first PWM reference signal and second PWM reference signals respectively.

11. The three-phase paralleled active front-end drive of claim 10, further including perturbating a duty cycle of at least one of the first set of control signals and the second set of control signals based on at least one of the first PWM reference signal and second PWM reference signals.

12. The three-phase paralleled active front-end drive of claim 1, wherein the first converter includes a two level, three phase converter, the first inverter includes a two level, three phase inverter, the second converter includes a two level, three phase converter, and the second inverter includes a two level, three phase inverter.

13. The three-phase paralleled active front-end drive of claim 1, wherein at least one of the first converter, the first inverter, the second converter and the second inverter is a three level converter or inverter respectively.

14. The three-phase paralleled active front-end drive of claim 13, wherein the first converter includes a first converter neutral point, the first inverter includes a first inverter neutral point, the second converter includes a second converter neutral point, the second inverter includes a second inverter neutral point, the first converter neutral point electrically connected to the first inverter neutral point and the second converter neutral point electrically connected to the second inverter neutral point, wherein the first converter neutral point is not electrically connected to the second inverter neutral point and the first inverter neutral point is not electrically connected to the second converter neutral point.

15. The three-phase paralleled active front-end drive of claim 13, wherein the first converter includes a first converter neutral point, the first inverter includes a first inverter neutral point, the second converter includes a second converter neutral point, the second inverter includes a second inverter neutral point, wherein at least one of (i) the first converter neutral point is electrically connected to the second inverter neutral point and (ii) the first inverter neutral point is electrically connected to the second converter neutral point.

16. The three-phase paralleled active front-end drive of claim 13, further comprising at least one of a neutral point link electrically connecting the first converter neutral point to the first inverter neutral point and a second neutral point link electrically connecting the second converter neutral point to the second inverter neutral point.

17. A motor control system with a three-phase paralleled active front-end drive, comprising:
   a first plurality of interphase inductors configured for connection to a three phase alternating current (AC) power source and operable to distribute power from a three phase alternating current source to a plurality of active converters configured to transfer power to a first and an second direct current (DC) bus respectively;
   a bus coupler operably coupling the first DC bus to a second DC bus;
   a first inverter operably connected to the first DC bus;
   a second inverter operably connected the second DC bus, the first inverter and second the inverter each configured to provide a plurality of motor excitation signals;
   a first controller operably connected to the first inverter and the second inverter, the controller configured to generate control signals to cause the first inverter and the second inverter to generate a plurality of motor excitation signals respectively; and
   a second plurality of interphase inductors operable to combine the plurality of motor excitation signals from the first inverter with the plurality of motor excitation signals from the second inverter; and
   a motor operably connected to the plurality of interphase inductors, the motor configured to receive the plurality of combined motor excitation signals.

18. The motor control system of claim 17, further comprising a second controller wherein the first controller and the second controller implement a method to cause the first inverter and the second inverter to provide substantially equal motor excitation currents respectively.

19. The motor control system of claim 17, wherein each interphase inductor includes a pair of windings and is configured to control a circulation current of the three-phase paralleled active front-end drive.

20. The motor control system of claim 17, wherein the controller is configured to implement a method to cause the first inverter and the second inverter to provide substantially equal motor excitation currents respectively.

21. A conveyance system comprising:
   a machine having a motor;
   a source of AC power;
   a first inductive interface coupled to the source of AC power, the inductive interface including a plurality of inductive elements;
   a drive system coupled to the first inductive interface, the drive system to provide multi-phase drive signals to the motor, the drive system including:
   a first drive having a first converter and a first inverter, the first convertor including a first DC bus;
   a second drive having a second converter and a second inverter, the second convertor including a second DC bus, the first DC bus and the second DC bus are electrically connected;
   wherein the first inductive interface is configured to distribute the AC power to the first drive and the second drive; and
   a second inductive interface coupled to the first inverter and the second inverter, the second inductive interface including a plurality of inductive elements, the second inductive interface combining motor excitation signals from the first inverter and the second inverter for each phase of the motor excitation signals and providing the combined motor excitation signals to the motor.

22. A method of controlling a three-phase paralleled active front-end drive configured for connection to a three phase alternating current power source; the method comprising:
   operably connecting a first plurality of interphase inductors configured for connection to the three phase alternating current (AC) power source and operable to distribute power from the three phase alternating current source to a first and a second active converters, the first and the second active converters configured to transfer power to a first and an second direct current (DC) bus respectively;
   operably coupling the first DC bus to a second DC bus via a bus coupler;
   operably connecting a first inverter to the first DC bus and operably connecting a second inverter to the second DC bus, the first inverter and second the inverter each configured to provide a plurality of motor excitation signals;
   operably connecting a first controller to the first inverter and the second inverter, the first controller configured to generate control signals to cause the first inverter and the second inverter to generate a plurality of motor excitation signals respectively, the first controller
   generating a first pulse width modulation (PWM) reference signal and a second PWM reference signal,
   generating a first set of control signals to the first inverter and generating a second set of control signals to the second inverter based on at least one of the first PWM reference signal and the second PWM reference signal,
   generating a duty cycle for the control signals based on at least one of the first PWM reference signal and the second PWM reference signal,
   perturbating a duty cycle of at least one of the first set of control signals and the second set of control signals based on at least one of the first PWM reference signal and second PWM reference signals cause the first inverter and the second inverter to provide substantially equal motor excitation currents respectively; and
   combining the plurality of motor excitation signals from the first inverter with the plurality of motor excitation signals from the second inverter with a plurality of interphase inductors.

23. The method of controlling a three-phase paralleled active front-end drive of claim 22, further comprising operably connecting a second controller to the first controller and the second inverter, wherein the first controller and the second controller cause the first inverter and the second inverter to provide substantially equal motor excitation currents respectively.

24. The method of controlling a three-phase paralleled active front-end drive of claim 23, wherein:
   the first controller generates a first pulse width modulation (PWM) reference signal and the second controller generating a second PWM reference signal;
   the first controller and the second controller each generate a duty cycle for the control signals based on the first PWM reference signal and second PWM reference signals respectively,
   the first controller generates a first set of control signals to the first inverter and the second controller generates a second set of control signals to the second inverter based on the first PWM reference signal and second PWM reference signals respectively.

25. The method of controlling a three-phase paralleled active front-end drive of claim 24, further including communicating timing of a reference point on the first reference to the second controller, the second controller adjusting a period of its PWM reference signal based on the timing.

26. The method of controlling a three-phase paralleled active front-end drive of claim 24, further including perturbating a duty cycle of at least one of the first set of control signals and the second set of control signals based on at least one of the first PWM reference signal and second PWM reference signals.

27. The method of controlling a three-phase paralleled active front-end drive of claim 24, wherein the second PWM reference signal is 180 degrees out of phase from the first pulse width modulation (PWM) reference signal.

28. The method of controlling a three-phase paralleled active front-end drive of claim 22, wherein the second PWM reference signal is 180 degrees out of phase from the first (PWM) reference signal.

* * * * *